US006304366B1

(12) United States Patent
Scalora et al.

(10) Patent No.: US 6,304,366 B1
(45) Date of Patent: Oct. 16, 2001

(54) PHOTONIC SIGNAL FREQUENCY CONVERSION USING A PHOTONIC BAND GAP STRUCTURE

(76) Inventors: Michael Scalora, 15037 Ashmont Cir., Huntsville, AL (US) 35803; Mark J. Bloemer, 15829 Sanderson La., Athens, AL (US) 35613

( * ) Notice: Subject to any disclaimer, the term of this patent is extended or adjusted under 35 U.S.C. 154(b) by 0 days.

(21) Appl. No.: 09/382,690

(22) Filed: Aug. 25, 1999

Related U.S. Application Data

(63) Continuation of application No. PCT/US98/06378, filed on Apr. 2, 1998.

(51) Int. Cl.[7] ........................................... G02F 1/35
(52) U.S. Cl. .................. 359/328; 372/21; 372/22
(58) Field of Search ............... 359/328; 372/22, 372/21

(56) References Cited

U.S. PATENT DOCUMENTS

| H1182 | 5/1993 | Spry ........................ 359/320 |
|---|---|---|
| 3,410,625 | 11/1968 | Edwards ................... 350/166 |
| 3,637,294 | 1/1972 | Berthold, III ............ 350/166 |
| 3,682,528 | 8/1972 | Apfel et al. ............... 350/1 |
| 3,697,153 | 10/1972 | Zycha ....................... 350/166 |
| 3,698,946 | 10/1972 | Kaspaul et al. .......... 117/211 |
| 3,706,485 | 12/1972 | Fawcett et al. ........... 350/164 |
| 3,759,604 | 9/1973 | Thelen ...................... 350/166 |
| 3,853,386 | 12/1974 | Ritter et al. .............. 350/164 |

(List continued on next page.)

FOREIGN PATENT DOCUMENTS

| 0 012 439 A1 | 6/1980 | (EP) | ............... G02F/1/21 |
|---|---|---|---|
| 0 782 017 A2 | 7/1997 | (EP) | ............... G02B/6/12 |
| 0 782 017 A3 | 7/1997 | (EP) | ............... G02B/6/12 |
| 1406940 | 9/1975 | (GB) | ............... G02B/1/10 |
| 59-151108 | 8/1984 | (JP) | ............... G02B/5/20 |
| 64-80908 | 3/1989 | (JP) | ............... G02B/5/28 |
| 2-187732 | 7/1990 | (JP) | ............... G02F/1/23 |
| WO 96/11516 | 4/1996 | (WO) | ............... H01S/3/085 |

OTHER PUBLICATIONS

Scalora et al.: "Pulse second–harmonic generation in non-linear, one–dimensional, perodic structures", Physical Review A, vol. 56, No. 4, pp. 3166–3174, Oct. 1997.*
Ashcroft, Neil W. and Mermin, N. David, *Solid State Physics*, Holt, Rinehart and Winston, 1976, pp. xi–xii and 765–766.
Assanto, Gaetano, "Quadratic Cascading: Effects and Applications," *Beam Shaping and Control with Nonlinear Optics*, (ed. By Kajzar and Reinisch), 1998, pp. vii–viii and 341–374.

(List continued on next page.)

Primary Examiner—Georgia Epps
Assistant Examiner—Tim Thompson
(74) Attorney, Agent, or Firm—Sterne, Kessler, Goldstein & Fox P.L.L.C.

(57) ABSTRACT

A novel SH generator based on a photonic band gap (PBG), mixed half-quarter-wave, periodic structure is described. Both energy output and conversion efficiencies are nearly three orders of magnitude greater than for bulk, phase-matched devices of comparable lengths. Similar results for a GaAs/AlAs semiconductor periodic structure are also found. These results have immediate applications in frequency up- and down-conversion lasers, higher and lower harmonic generation, and Raman-type lasers, where either Stokes or anti-Stokes resonances can be enhanced or suppressed near the band edge. In general, the underlying mechanism requires the fields to be strongly confined, allowing for longer interaction times, increased effective gain lengths, and enhanced conversion efficiencies, although strong pump confinement alone can also result in significantly enhanced SH generation.

20 Claims, 10 Drawing Sheets

U.S. PATENT DOCUMENTS

| | | | |
|---|---|---|---|
| 3,885,855 | 5/1975 | Gross | 350/1 |
| 3,889,026 | 6/1975 | Groth | 428/34 |
| 3,901,997 | 8/1975 | Groth | 428/428 |
| 3,914,023 | 10/1975 | Thelen | 350/164 |
| 3,978,273 | 8/1976 | Groth | 428/434 |
| 4,179,181 | 12/1979 | Chang | 350/1.7 |
| 4,189,205 | 2/1980 | Vandehei | 350/1.7 |
| 4,229,066 | 10/1980 | Rancourt et al. | 350/1.6 |
| 4,240,696 | 12/1980 | Tracy et al. | 350/163 |
| 4,269,481 | 5/1981 | Yeh et al. | 350/356 |
| 4,441,789 | 4/1984 | Pohlack | 350/166 |
| 4,488,775 | 12/1984 | Yamamoto | 350/164 |
| 4,525,687 | 6/1985 | Chemla et al. | 332/7.51 |
| 4,556,277 | 12/1985 | Fan et al. | 350/1.7 |
| 4,590,118 | 5/1986 | Yatabe et al. | 428/215 |
| 4,726,655 | 2/1988 | Mahlein | 350/166 |
| 4,756,602 | 7/1988 | Southwell et al. | 350/166 |
| 4,770,496 | 9/1988 | Mahlein | 350/166 |
| 4,773,717 | 9/1988 | Pai et al. | 350/3.7 |
| 4,838,648 | 6/1989 | Phillips et al. | 350/166 |
| 4,846,551 | 7/1989 | Rancourt et al. | 350/166 |
| 4,915,494 | 4/1990 | Shipley et al. | 350/641 |
| 5,035,485 | 7/1991 | Kageyama et al. | 350/164 |
| 5,071,206 | 12/1991 | Hood et al. | 359/360 |
| 5,111,329 | 5/1992 | Gajewski et al. | 359/275 |
| 5,119,232 | 6/1992 | Daley et al. | 359/359 |
| 5,148,504 | 9/1992 | Levi et al. | 385/14 |
| 5,170,290 | 12/1992 | Land et al. | 359/579 |
| 5,179,468 | 1/1993 | Gasloli | 359/359 |
| 5,187,461 | 2/1993 | Brommer et al. | 333/219.1 |
| 5,212,584 | 5/1993 | Chung | 359/260 |
| 5,225,930 | 7/1993 | Land et al. | 359/578 |
| 5,233,464 | 8/1993 | Costich | 359/359 |
| 5,239,406 | 8/1993 | Lynam | 359/275 |
| 5,247,528 * | 9/1993 | Shinozaki et al. | 372/22 |
| 5,262,894 | 11/1993 | Wheatley et al. | 359/586 |
| 5,268,785 | 12/1993 | Crenshaw et al. | 359/244 |
| 5,302,449 | 4/1994 | Eby et al. | 428/336 |
| 5,315,430 | 5/1994 | Brennan et al. | 359/248 |
| 5,315,437 | 5/1994 | Alfano et al. | 359/588 |
| 5,337,183 | 8/1994 | Rosenblatt | 359/248 |
| 5,345,328 | 9/1994 | Fritz et al. | 359/248 |
| 5,355,245 | 10/1994 | Lynam | 359/267 |
| 5,372,874 | 12/1994 | Dickey et al. | 428/216 |
| 5,406,573 | 4/1995 | Ozbay et al. | 372/43 |
| 5,424,559 | 6/1995 | Kasahara | 257/21 |
| 5,433,988 | 7/1995 | Fukuda et al. | 428/141 |
| 5,440,421 | 8/1995 | Fan et al. | 359/344 |
| 5,448,404 | 9/1995 | Schrenk et al. | 359/584 |
| 5,457,570 | 10/1995 | Lu et al. | 359/361 |
| 5,471,180 | 11/1995 | Brommer et al. | 333/202 |
| 5,480,722 | 1/1996 | Tomonaga et al. | 428/428 |
| 5,493,442 | 2/1996 | Buchholz et al. | 359/359 |
| 5,506,037 | 4/1996 | Termath | 428/216 |
| 5,513,039 | 4/1996 | Lu et al. | 359/584 |
| 5,514,476 | 5/1996 | Hartig et al. | 428/426 |
| 5,552,882 * | 9/1996 | Lyons et al. | 356/3.1 |
| 5,557,462 | 9/1996 | Hartig et al. | 359/585 |
| 5,559,825 | 9/1996 | Scalora et al. | 372/96 |
| 5,563,734 | 10/1996 | Wolfe et al. | 359/360 |
| 5,591,529 | 1/1997 | Braatz et al. | 428/457 |
| 5,595,825 | 1/1997 | Guiselin | 428/428 |
| 5,615,289 | 3/1997 | Duck et al. | 385/24 |
| 5,740,287 | 4/1998 | Scalora et al. | 385/6 |
| 5,751,466 | 5/1998 | Dowling et al. | 359/248 |
| 5,796,902 * | 8/1998 | Bhat et al. | 385/122 |
| 5,801,378 | 9/1998 | Hane et al. | 250/237 G |
| 5,907,427 | 5/1999 | Scalora et al. | 359/248 |
| 5,909,035 | 6/1999 | Kim | 257/59 |

OTHER PUBLICATIONS

Ball, G.A. and Morey, W.W., "Continuously tunable single–mode erbium fiber laser," *Optics Letters,* vol. 17, No. 6, Mar. 15, 1992, pp. 420–422.

Bendickson, J.M. et al., "Analytic expressions for the electromagnetic mode density in finite, one–dimensional, photonic band–gap structures," *Physical Review E,* vol. 53, No. 4–B, Apr. 1996, pp. 4107–4121.

Bloemer, M.J. and Scalora, M., "Transmissive properties of AG/MgF$_2$ photonic band gaps," *Applied Physics Letters,* vol. 72, No. 14, Apr. 6, 1998, pp. 1676–1678.

Bouché, N. et al., "Dynamics of gain in vertical cavity lasers and amplifiers at 1.53 μm using femtosecond photoexcitation," *Applied Physics Letters,* vol. 73, No. 19, Nov. 9, 1998, pp. 2718–2720.

Centini, M. et al., "Dispersive properties of finite one–dimensional photonics band gap structures: Applications to nonlinear quadratic interactions," *Physical Review E,* vol. 60, No. 4–B, Oct. 1999, pp. 4891–4898.

Cojocaru, C. et al., "Active reflection via a phase–insensitive quadratic nonlinear interaction within a microcavity," *Applied Physics Letters,* vol. 74, No. 4, Jan. 25, 1999, pp. 504–506.

D'Aguanno, G.D. et al., "Enhancement of $x_{(2)}$ cascading processes in one–dimensional photonic bandgap structures," *Optics Letters,* vol. 24, No. 23, Dec. 1, 1999, pp. 1663–1665.

DeSalvo, R. et al., "Self–focusing and self–defocusing by cascaded second–order effects in KTP," *Optic Letters,* vol. 17, No. 1, Jan. 1, 1992, pp. 28–30.

Dialog File 348 (European Patents) English Language Patent Abstract for EP 0 012 439 A1, published Jun. 25, 1990, page 1.

Dowling, J.P. et al., "The photonic band edge laser: A new approach to gain enhancement," *Journal of Applied Physics,* vol. 75, No. 4, Feb. 15, 1994, pp. 1896–1899.

Fowles, Grant R., *Introduction to Modern Optics,* Second Edition, 1975, Holt, Rhinehart and Winston, pp. v–viii, 33–38, 52–55 and 96–103.

Grétillat, M.–A. et al., "Electrostatic Polysilicon Microrelays Integrated with MOSFETs," *Proceedings Of Micro Electro Mechanical Systems,* 1994, pp. 97–101.

Haus, J.W. et al., "Enhanced second–harmonic generation in media with a weak periodicity," *Physical Review A,* vol. 57, No. 3, Mar. 1988, pp. 2120–2128.

"Indicators and displays," *Machine Design: 1988 Reference Issue Series,* May 19, 1988, pp. 190–200.

Joannopoulos, John D. et al., *Photonic Crystals: Molding the Flow of Light,* 1995, Princeton University Press, (copy of entire book provided).

Lewis, C.F., "Optical Coatings: More Than Meets the Eye," *Materials Engineering,* Nov. 1989, pp. 29–32.

MacLeod, H.A., *Thin–Film Optical Filters,* Second Edition, 1986, Macmillan Publishing Company, (copy of entire book provided).

Marion, Jerry B., *Classical Electromagnetic Radiation,* 1965, Academic Press, pp. ix–xv, 148–152, 170–177.

Martorell, J. et al., "Pseudo–metal reflection at the interface between a linear and a nonlinear material," *Optics Communications,* vol. 144, Nos. 1–3, Dec. 1, 1997, pp. 65–69.

Mooney, T.A., "Which Coating Process Should I Choose?," *Lasers & Optronics,* Jul. 1988, pp. 39–44.

Pasachoff, Jay M. and Kutner, Marc L., *University Astronomy,* 1978, W.B. Saunders Company, pp. ix–xvii and 177–239.

Patent Abstracts of Japan, vol. 018, No. 095 (E–1509), JP 05 299751 A, published Nov. 12, 1993.

Patent Abstracts of Japan, vol. 014, No. 468 (P–1115), JP 2187732, published Jul. 23, 1990.

Patent Abstracts of Japan, vol. 008, No. 081 (E–238), JP 59 000977 A, published Jan. 6, 1984.

Petersen, K.E., "Micromechanical Membrane Switches on Silicon," *IBM J. Res. Develop.*, vol. 23, No. 4, Jul. 1979, pp. 376–385.

Rao, Y.J. et al., "Spatially–multiplexed fiber–optic Bragg grating strain and temperature sensor system based on interferometric wavelength–shift detection," *Electronics Letters*, vol. 31, No. 12, Jun. 8, 1995, pp. 1009–1010.

Scalora, M. and Crenshaw, M.E., "A beam propagation method that handles reflections," *Optics Communications*, vol. 108, Nos. 4–6, Jun. 1, 1994, pp. 191–196.

Scalora, M. et al., "Dipole emission rates in one–dimensional photonic band–gap materials," *Applied Physics B*, Supplement to vol. B 60, No. 2/3, 1995, pp. S57–S61.

Scalora, M. et al., "Optical Limiting and Switching of Ultrashort Pulses in NonLinear Photonic Band–Gap Materials," *Physical Review Letters*, vol. 73, No. 10, Sep. 5, 1994, pp. 1368–1371.

Scalora, M. et al., "The photonic band–edge optical diode," *Journal of Applied Physics*, vol. 76, No. 4, Aug. 15, 1994, pp. 2023–2026.

Scalora, M. et al., "Pulse propagation near highly reflective surfaces: applications to photonic band–gap structures and the question of superluminal tunneling times," *Physical Review A.*, vol. 52, No. 1, Jul. 1995, pp. 726–734.

Scalora, M. et al., "Pulsed second–harmonic generation in non–linear, one–dimensional, periodic structures," *Physical Review A*, vol. 56, No. 4, Oct. 1997, pp. 3166–3174.

Scalora, M. et al., "Ultrashort pulse propagation at the photonic band edge: large tunable group delay with minimal distortion and loss," *Physical Review E*, vol. 54, No. 2, Aug. 1996, pp. R1078–R1081.

Sprung, D.W.L. et al., "Scattering by a finite periodic potential," *Americn Journal of Physics*, vol. 61, No. 12, Dec. 1993, pp. 1118–1124.

Sze, S.M., *Physics of Semiconductor Devices*, Second Edition, 1981, John Wiley & Sons, pp. ix–xii and 681–742.

Sze, S.M., *Semiconductor Devices: Physics & Technology*, 1985, John Wiley & Sons, pp. ix–xi and 252–467.

Tocci, M.D. et al., "Thin–film nonlinear optical diode," *Applied Physics Letters*, vol. 66, No. 18, May 1, 1995, pp. 2324–2326.

Ward, A.J. et al., "Photonic dispersion surfaces," *Journal of Physics: Condensed Matter*, vol. 7, No. 10, Mar. 6, 1995, pp. 2217–2224.

Yao, J.J. et al., "A Surface Micromachined Miniature Switch for Telecommunications Applications with Signal Frequencies from DC up to 4 Ghz," *Transducers '95*, 1995, pp. 384–387.

Yariv, Amnon and Yeh, Pochi, *Optical Waves in Crystals: Propagation and Control of Laser Radiation*, 1984, John Wiley & Sons, pp. vii–xi and 439–447.

Akhmediev, N. et al., "Stability analysis of even and odd waves of symmetric nonlinear planar optical waveguides," *J. Opt. Soc. Am. B*, vol. 10, No. 2, Feb. 1993, pp. 230–236.

Bowden, C.M. et al., "Development and Applications of Materials Exhibiting Photonic Band Gaps," *J. Opt. Soc. Am. B*, vol. 10, No. 2, Feb. 1993, pp. 279–280.

Brown, E.R. et al., "Radiation properties of a planar antenna on a photonic–crystal substrate," *J. Opt. Soc. Am. B*, vol. 10, No. 2, Feb. 1993, pp. 404–407.

Bullock, D.L. et al., "Photonic band structure investigation of two–dimensional Bragg reflector mirrors for semiconductor laser mode control," *J. Opt. Soc. Am. B*, vol. 10, No. 2, Feb. 1993, pp. 399–403.

Chernov, V.E. and B.A. Zon, "Depolarization of laser radiation in a nonlinear medium," *J. Opt. Soc. Am. B*, vol. 10, No. 2, Feb. 1993, pp. 210–212.

Chu, D.Y. and S.–T. Ho, "Spontaneous emission from excitons in cylindrical dielectric waveguides and the spontaneous–emission factor of microcavity ring lasers," *J. Opt. Soc. Am. B*, vol. 10, No. 2, Feb. 1993, pp. 381–390.

Crook, R.J. et al., "Long–range optical modes supported by a strongly absorbing thin organic film," *J. Opt. Soc. Am. B*, vol. 10, No. 2, Feb. 1993, pp. 237–243.

De Martini, F. et al., "Spontaneous and stimulated emission in the thresholdless microlaser," *J. Opt. Soc. Am. B*, vol. 10, No. 2, Feb. 1993, pp. 360–380.

Dowling, J.P. and C.M. Bowden, "Beat radiation from dipoles near a photonic band edge," *J. Opt. Soc. Am. B*, vol. 10, No. 2, Feb. 1993, pp. 353–355.

Dutta, B. et al., "Squeezed states, photon–number distributions, and U(1) invariance," *J. Opt. Soc. Am. B*, vol. 10, No. 2, Feb. 1993, pp. 253–264.

Erdogan, T. et al., "Enhancement and inhibition of radiation in cylindrically symmetric, periodic structures," *J. Opt. Soc. Am. B*, vol. 10, No. 2, Feb. 1993, pp. 391–398.

Gaylord, T.K. et al., "Application of electromagnetics formalism to quantum–mechanical electron–wave propagation in semiconductors," *J. Opt. Soc. Am. B*, vol. 10, No. 2, Feb. 1993, pp. 333–339.

Genack, A.Z. and N. Garcia, "Electromagnetic localization and photonics," *J. Opt. Soc. Am. B*, vol. 10, No. 2, Feb. 1993, pp. 408–413.

Helmfrid, S. et al., "Influence of various imperfections on the conversion efficiency of second–harmonic generation in quasi–phase–matching lithium niobate waveguides," *J. Opt. Soc. Am. B*, vol. 10, No. 2, Feb. 1993, pp. 222–229.

Kilin, S.Ya. and I.I. Fedchenia, "Statistics of random spikes in the intensity of stimulated Raman scattering: initiation by spatially distributed fluctuations," *J. Opt. Soc. Am. B*, vol. 10, No. 2, Feb. 1993, pp. 199–209.

Kurizki, G. et al., "Quantum electrodynamics in photonic band gaps: atomic–beam interaction with a defect mode," *J. Opt. Soc. Am. B*, vol. 10, No. 2, Feb. 1993, pp. 346–352.

Leoński, W., "Squeezed–state effect on bound–continuum transitions," *J. Opt. Soc. Am. B*, vol. 10, No. 2, Feb. 1993, pp. 244–252.

Leung, K.M., "Defect modes in photonic band structures: a Green's function approach using vector Wannier functions," *J. Opt. Soc. Am. B*, vol. 10, No. 2, Feb. 1993, pp. 303–306.

Maradudin, A.A. and A.R. McGurn, "Photonic band structure of a truncated, two–dimensional, periodic dielectric medium," *J. Opt. Soc. Am. B*, vol. 10, No. 2, Feb. 1993, pp. 307–313.

Meade, R.D. et al., "Nature of the photonic band gap: some insights from a field analysis," *J. Opt. Soc. Am. B*, vol. 10, No. 2, Feb. 1993, pp. 328–332.

Montemezzani, G. et al., "Photorefractive charge compensation at elevated temperatures and application to $KNbO_3$," *J. Opt. Soc. Am. B*, vol. 10, No. 2, Feb. 1993, pp. 171–185.

Mossberg, T.W. and M. Lewenstein, "Radiative properties of strongly driven atoms in the presence of photonic bands and gaps," *J. Opt. Soc. Am. B,* vol. 10, No. 2, Feb. 1993, pp. 340–345.

Robertson, W.M. et al., "Measurement of the photon dispersion relation in two–dimensional ordered dielectric arrays," *J. Opt. Soc. Am. B,* vol. 10, No. 2, Feb. 1993, pp. 322–327.

Smith, D.R. et al., "Photonic band structure and defects in one and two dimensions," *J. Opt. Soc. Am. B,* vol. 10, No. 2, Feb. 1993, pp. 314–321.

Sözüer, H. Sami and J. W. Haus, "Photonic bands: simple–cubic lattice," *J. Opt. Soc. Am. B,* vol. 10, No. 2, Feb. 1993, pp. 296–302.

Sugawara, T. et al., "Instability in a $CO_2$ sequence–band laser with a saturable absorber and vibration–to–vibration energy transfer processes," *J. Opt. Soc. Am. B,* vol. 10, No. 2, Feb. 1993, pp. 265–270.

Tong, B.Y. et al., "Fluorescence–lifetime measurements in monodispersed suspensions of polystyrene particles," *J. Opt. Soc. Am. B,* vol. 10, No. 2, Feb. 1993, pp. 356–359.

Wijekoon, W.M.K.P. et al., "Second–harmonic generation studies of differences in molecular orientation of Langmuir–Blodgett films fabricated by vertical and horizontal dipping techniques," *J. Opt. Soc. Am. B,* vol. 10, No. 2, Feb. 1993, pp. 213–221.

Yablanovich, E., "Photonic band–gap structures," *J. Opt. Soc. Am. B,* vol. 10, No. 2, Feb. 1993, pp. 283–295.

Zahavi, O. et al., "Study of amplified spontaneous emission systems by the ray–tracing technique," *J. Opt. Soc. Am. B,* vol. 10, No. 2, Feb. 1993, pp. 271–278.

Ziolkowski, R.W. and J.B. Judkins, "Full–wave vector Maxwell equation modeling of the self–focusing of ultrashort optical pulses in a nonlinear Kerr medium exhibiting a finite response time," *J. Opt. Soc. Am. B,* vol. 10, No. 2, Feb. 1993, pp. 186–198.

Dialog File 347 (JPO & JAPIO) English Language Patent Abstract for JP 59–151108, pubished Aug. 29, 1984, p. 1.

Written Opinion for PCT Appl. No. PCT/US98/06378, dated Feb. 15, 2000, 7 pages.

International Search Report for PCT Appl. No. PCT/US98/06378, dated Dec. 3, 1998, 4 pages.

\* cited by examiner

PHOTONIC SIGNAL FREQUENCY CONVERSION USING A PHOTONIC BAND GAP STRUCTURE

Cross-Reference to Related Application

This is a continuation of International Application PCT/US98/06378, with an international filing date of Apr. 2, 1998, now pending (incorporated by reference herein in its entirety).

Statement as to Rights to Inventions Made Under Federally-Sponsored Research and Development This invention was made with Government support under Contract DAAH01-96-P-R010 awarded by the U.S. Army Missile Command. The Government has certain rights in the invention.

BACKGROUND OF THE INVENTION

1. Field of the Invention

This invention relates to the generation of photonic signals at frequencies other than the input signal. In particular, it relates to second or higher harmonic generation, sum, and difference frequency conversion, Raman processes and generic parametric amplification near the photonic band edge.

2. Related Art

In recent years, advances in photonic technology have generated a trend toward the integration of electronic and photonic devices. These devices offer an array of advantages over conventional electronic devices. For example, they can provide enhanced speed of operation, reduced size, robustness to environmental changes. such as rapid temperature variations, and increased lifetime and ability to handle high repetition rates. These structures can be made of metals, semiconductor materials, ordinary dielectrics, or any combination of these materials.

The theoretical and experimental investigations of photonic band gap (PBG) structures is evidence of the widely recognized potential that these new materials offer. In such materials, electromagnetic field propagation is forbidden for a range of frequencies, and allowed for others. The nearly complete absence of some frequencies in the transmitted spectrum is referred to as a photonic band gap (PBG), in analogy to semiconductor band gaps. This phenomenon is based on the interference of light; for frequencies inside the band gap, forward- and backward-propagating components can cancel destructively inside the structure, leading to complete reflection.

For example, recent advancements in PBG structures have been made in the development of a photonic band edge nonlinear optical limiter and switch. See, "Optical Limiting and Switching of Ultrashort Pulses in Nonlinear Photonic Band-Gap Materials", M. Scalora, et al., *Physical Review Letters* 73:1368 (1994) (incorporated by reference herein in its entirety). Also, advancements in photonic technology have been achieved with the development of the nonlinear optical diode. See, "The Photonic Band-Edge Optical Diode", M. Scalora, et al., *Journal of Applied Physics* 76:2023 (1994), which is incorporated by reference herein in its entirety. In addition, the physical processes involved in the photonic signal delay imparted by a uniform PBG structure are described in detail in Scalora, et al., "Ultrashort pulse propagation at the photonic band edge: large tunable group delay with minimal distortion and loss." Phys. Rev. E Rapid Comm. 54(2), R1078-R1081 (August 1996), which is incorporated by reference herein in its entirety.

The frequency conversion of coherent light sources, such as lasers, has been investigated for many years, because of the desirability to expand the ranges of available output wavelengths. Many different processes have been utilized, including Raman-shifting, harmonic generation, and quasi-phase-matching techniques. Also important are frequency up-and down-conversion, and the more general issue of obtaining laser radiation at frequencies generally not accessible with a more direct process.

Harmonic generation involves the non-linear interactions between light and matter using a suitable non-linear material that can generate harmonics at multiples of the pump signal frequency. Conventional non-linear materials include potassium dihydrogen phosphate (KDP), β-barium borate (BBO), lithium triborate (LBO), lithium niobate (LiNbO$_3$), and the like. However, the utility of these types of non-linear crystals for efficient frequency conversion often depends on proper adjustment of parameters such as non-linear coefficients, phasematching capabilities, walkoff angle, and angular acceptance.

For example, lithium niobate is conventionally used for second harmonic (SH) generation because its nonlinear $\chi^{(2)}$ coefficient is larger than most other materials. In addition, the effective magnitude of $\chi^{(2)}$ can be enhanced further by a process called polling. Typically, a certain length of LiNbO$_3$ material, ordinarily a few millimeters to a few centimeters, is subdivided in sections each on the order of a few microns in thickness. Then, a strong, static electric field is applied to the material such that the direction of the electric field is reversed in each successive section. In effect then, the field leaves a permanent impression behind, similar to the impression that visible light leaves on a photographic plate, which causes the sign of the $\chi^{(2)}$ to reverse in a predetermined way in each successive section throughout the length of the material. As a consequence of alternating the sign of the nonlinear index of refraction, a technique that is also referred to as quasi-phase-matching (QPM), SH generation from a similar length of material that is not quasi-phase-matched can be orders of magnitude smaller than the phase-matched case.

The reason for this kind of material processing can be explained as follows. For SH generation, a field at twice the original frequency is generated. In addition to its dependence on field strength, the index of refraction of any material also depends on frequency. For typical SH up-conversion, the indices of refraction may differ by as much as 10% or more; this means that the speed of light in the material may differ by that amount, causing the two waves, the fundamental and the SH, to get out of phase. As it turns out, by modulating the $\chi^{(2)}$, the waves tend to remain in phase, which defines the QPM phenomenon, thus yielding enhanced SH generation.

However, QPM devices utilized in frequency conversion are typically on the order of a 1–2 centimeters (cm) in length. What is needed is a device that performs frequency conversion of a light source that is compact in size, has sufficient conversion efficiency, and can be manufactured by conventional techniques.

SUMMARY OF THE INVENTION

The present invention provides a new device and method to produce photonic signals at frequencies other than the frequency of the incident pump beam or pulse. The photonic band gap (PBG) device comprises a plurality of first and second material layers. The first and second material layers are arranged such that the PBG device exhibits a photonic band gap structure. The photonic band gap structure exhibits a transmission band edge corresponding to the pump signal frequency. A second photonic signal at a second frequency is generated by an interaction of the input photonic signal with the arrangement of layers. The second photonic signal is an harmonic of the pump signal and can be either transmitted through the device or reflected out the input region of the PBG device.

According to one embodiment of the present invention, the first and second layers are arranged in a periodically alternating manner. In addition, the PBG device can further comprise one or more periodicity defects in order to produce other harmonics of the pump signal.

According to the present invention, a method for the frequency conversion of a pump pulse comprises selecting a desired frequency for the pump signal to produce a second signal at a desired harmonic frequency. Next, a PBG structure is provided, wherein the arrangement of layers comprising the PBG structure is similar to the structure described above. The method further comprises inputting the desired pump signal into the PBG structure in order to produce an ouput signal at a desired harmonic of the pump signal frequency.

The generated signals can be in the form of either a continuous wave (cw) signal, if the pump beam is a cw signal, or a pulsed signal, if the pump beam is pulsed. The frequency conversion process for the PBG device is orders of magnitude more efficient than any other ordinary QPM device of comparable size. This conversion efficiency can be achieved with the utilization of a photonic band gap (PBG) structure. An incident pump beam or pulse is applied to the PBG device near the photonic band edge transmission resonance, in close proximity to the photonic band gap. The output signal (of different frequency or wavelength) that is generated in the PBG device is also tuned at a transmission resonance.

A frequency conversion device of compact size can be designed to perform a wide range of applications including harmonic generation and parametric oscillation by using a model of a one-dimensional structure. These PBG devices can also be fabricated by straightforward techniques to satisfy current technology needs.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview of the Present Invention

Figure 1A:
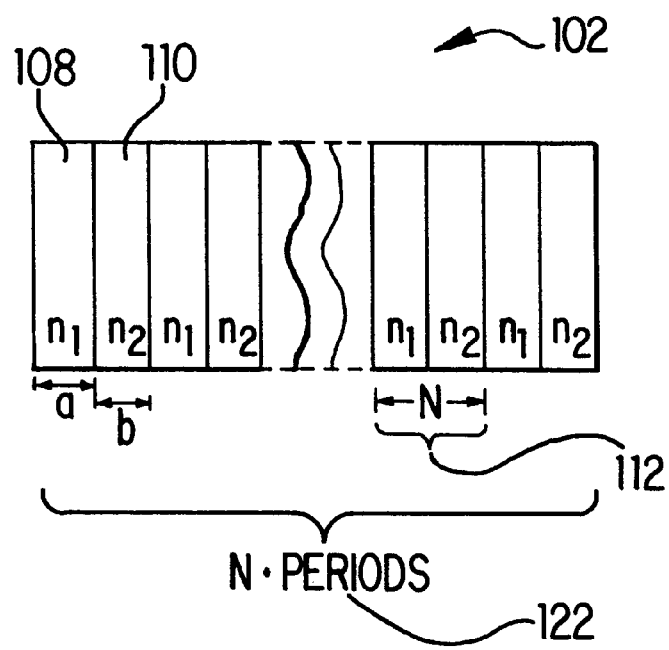
FIG. 1A is a schematic representation of one embodiment of the present invention, a quarter-wave frequency conversion device with a uniform PBG structure.

The present invention provides a frequency conversion device that utilizes a photonic band gap (PBG) structure. The enhancement mechanism demonstrated in these PBG structures in the linear regime leads to frequency up-(or down-) conversion rates nearly three orders of magnitude better than conversion rates achieved with ordinary phase matched materials, or in conventional fiber grating geometries. The geometrical properties and the periodicity of the PBG structure can act to significantly modify the density of electromagnetic field modes near the band edge, thus facilitating the emission of the second harmonic (SH) signal at a much-enhanced rate. More importantly perhaps, this means that current fabrication issues that arise in ordinary quasiphase-matched structures can be avoided altogether by utilizing current technology for deposition of semiconductor or dielectric thin films and combinations thereof.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

2. Nonlinear Interaction of Light with Matter

The nonlinear interaction of light with matter is important for applications in the field of light generation at frequencies that are usually not accessible by a more direct laser process. At a qualitative level, all materials found in nature are nonlinear to some degree. This means that the characteristic properties of ordinary materials, such as the dielectric susceptibility, change if an applied electromagnetic field intensity is strong enough.

This dependence of the susceptibility (which ultimately is a statement of the index of refraction of the material) on the electric field strength can be exemplified in the following way:

$$\chi = \chi^{(1)} + \chi^{(2)}E + \chi^{(3)}E^2 + \ldots \chi^{(j)}E^{j-1} \ldots + \ldots$$

where j is an integer, $\chi^{(1)}$ is the medium susceptibility for low incident fields, $\chi^{(j)}$ is the jth nonlinear coefficient whose magnitude decreases rapidly as (j) increases, and E is the applied field. Therefore, contributions from the jth term become significant if the field strength is gradually increased. Typically, the $\chi^{(j)}$ can be two to four orders of magnitude greater than each successive $\chi^{(j+1)}$ coefficient, depending on the material. On the other hand, all the coefficients with odd or even (j) greater than one may vanish, depending on the characteristics of the material at the molecular level. For example, all the even coefficients vanish if the molecule has a geometrical center of symmetry, as in a gas.

Because of the nonlinear contributions to the dielectric susceptibility, the application of a strong external optical field at frequency $\omega$ is capable of generating light at frequency $2\omega$, $3\omega$, $4\omega$, and so on. By the same token, if two strong fields of different frequencies $\omega_1$ and $\omega_2$ are applied to the nonlinear material, light at frequencies $(\omega_1+\omega_2)$ and $(\omega_1-\omega_2)$ (i.e., sum and difference frequencies) can also be generated in addition to the individual harmonics. For example, a $\chi^{(2)}$ medium, which means that the first order nonlinear coefficient dominates the dynamics, is capable of SH generation, and sum and difference frequency conversion; a $\chi^{(3)}$ medium is capable of third harmonic generation, and so on.

For example, a type of nonlinear frequency conversion that is typically sought in nonlinear media is SH generation. However, the present description is also applicable for nonlinear frequency conversion to higher or lower frequencies, such as third harmonic generation, and so on.

Conventional nonlinear materials used for frequency conversion processes. such as $LiNbO_3$, are processed in such a way that the nonlinear contribution to the index of refraction alternates sign every few tens of microns. However, the linear index of refraction of the $LiNbO_3$ host material is not modified in any way (i.e., it is spatially uniform).

The method of forming a device designed to perform frequency conversion, according to the present invention, is completely different: a spatial modulation is imparted to the linear part of the refractive index. In other words, the linear index of refraction of the structure alternates between a high and a low value. This is accomplished by alternating at least two materials, such as GaAs (Gallium Arsenide) and AlAs (Aluminum Arsenide), whose indices of refraction are approximately 3.4 and 2.9 respectively, resulting in a structure that is 5 to 10 microns in length. The consequence of alternating different materials with different refractive indices as indicated above is the creation of a photonic band gap (PBG) structure.

The physical processes that are exploited in the present invention are different from conventional frequency conversion techniques in that photonic band edge effects are utilized. Photonic band edge effects cause strong overlap of the pump and SH signals, significant reduction of the respective propagation velocities, and therefore, increased interaction times. As described below, some of the advantages of the present invention include: (1) the structure can be 100 to 1000 time shorter than typical QPM structures, with comparable conversion efficiencies; (2) ordinary semiconductor materials can be used in forming the PBG structure, leading to a reduction of production costs; and (3) the PBG device is compatible with integrated circuit environments due to its size and composition.

3. Frequency Conversion using a PBG Structure

In one dimension, a photonic band gap structure comprises a plurality of layers, as shown in FIG. 1A, where the plurality of layers alternates between a low and a high index of refraction. PBG structure 102 comprises a stack of alternating layers 108 and 110 of refractive materials having predetermined indices of refraction $n_1$ and $n_2$ (for low incident pump powers), and predetermined thicknesses a and b, respectively. In particular, the first type of layer 108 can be chosen such that it is a high index layer $n_1$. The second type of layer 110 can be chosen to be a low index layer $n_2$. The widths of the layers can be chosen such that they are both a fraction of the size of the incident pump wavelength.

For example, first layer 108 can be designed to have a thickness (a) corresponding to the wavelength of an incoming photonic signal ($\lambda$), determined by the equation $a=\lambda/4n_1$. Similarly, second layer 110 can have an index of refraction $n_2$, and a thickness (b), where $b=\lambda/4n_2$. This pattern can be repeated for N periods 122, where a period is equal to one set of alternating layers 112. This type of structure is also referred to as a quarter-wave structure. As would be apparent to one of ordinary skill in the art based on the present description, other arrangements of alternating layers can also be made, depending on the particular frequency conversion application.

Adjusting the width of the layers causes a shift of the location of the band gap to a different frequency. This property is a beneficial one, which adds flexibility when the options of input and output laser frequencies are being considered.

Figure 1B:
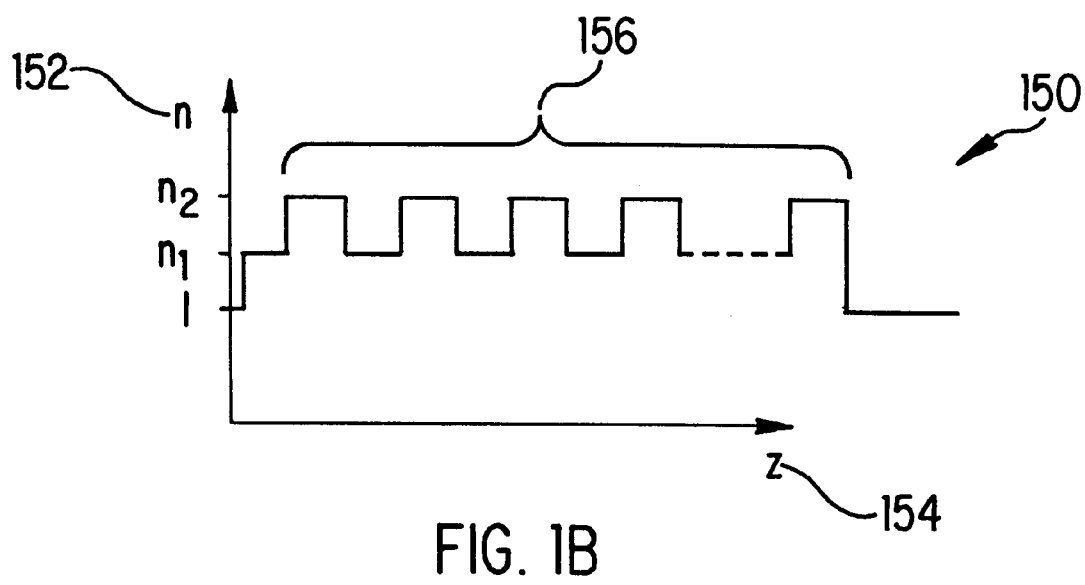
FIG. 1B is a diagram of the characteristic index of refraction profile of the uniform PBG structure shown in FIG. 1A.

FIG. 1B is a diagram of a characteristic index of refraction square-wave pattern profile of PBG structure 102 for N periods. Diagram 150 plots the index of refraction (n) 152 of a uniform PBG structure as a function of distance (z) 154, which is limited by the number of periods 156 in the device. Diagram 150 illustrates the periodic nature of the abrupt refractive index changes occurring in the material.

In general, large index modulation PBG structures are not as easily susceptible to band-structure shifts due to nonlinear index changes because index variations are a small perturbation on the linear index modulation depth. As described below, for ultrashort pulses tuned near the photonic band edge, a choice of materials with suitable indices of refraction, thicknesses, and periodicity can lead to low group velocities, enhanced field intensity, and conversion efficiencies nearly three orders of magnitude larger than conventional bulk up-conversion rates. Conversion efficiencies greater than $10^{-3}$ can be achieved for structures only a few micrometers in length, with a single pump pass, and at realistic pump intensities. Plane-wave conversion rates can be approximated by utilizing pulses whose frequency bandwidth is smaller than the transmission resonance bandwidth. such as for pump signals of only a few picoseconds (ps) in duration.

Figure 2:
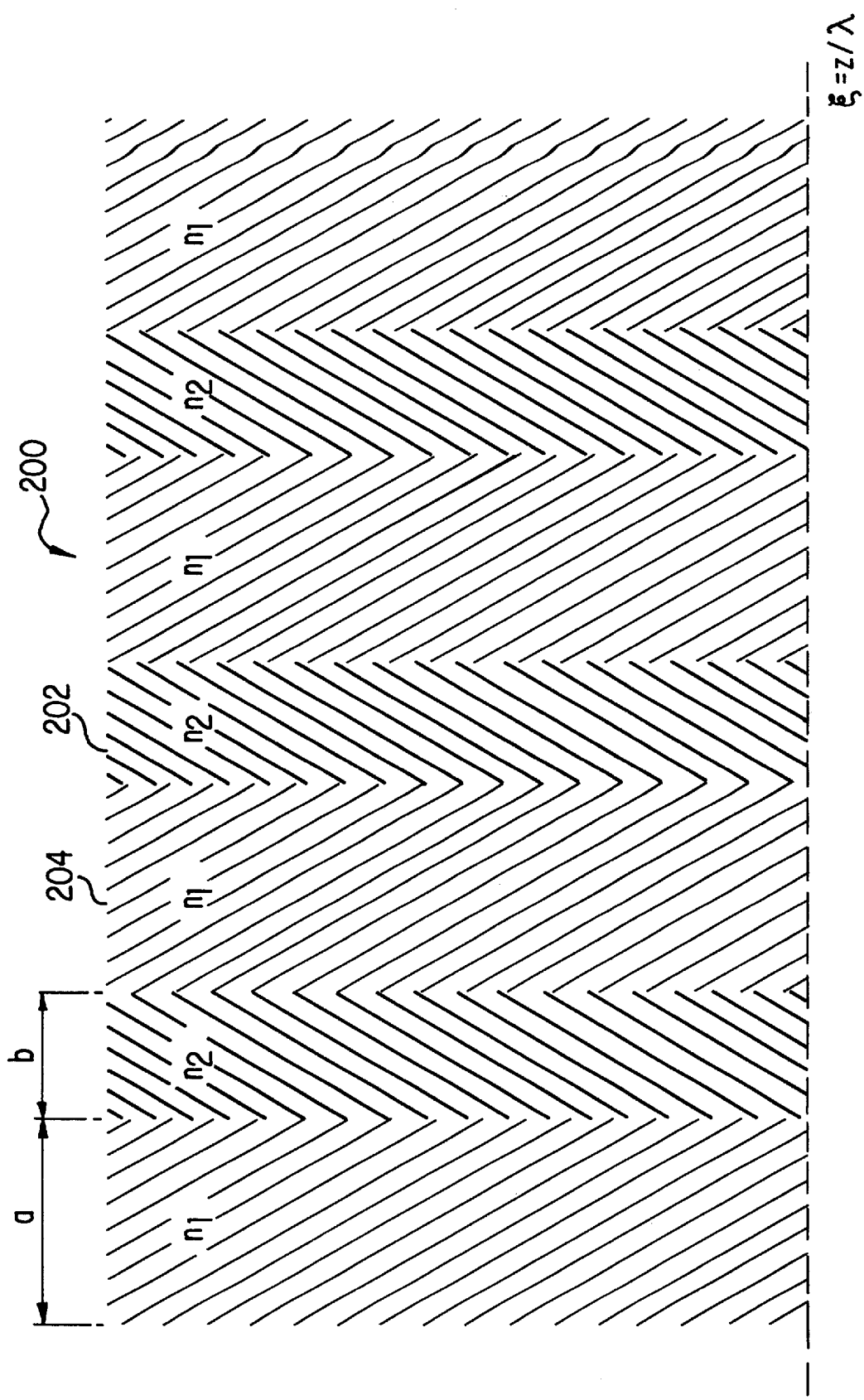
FIG. 2 is a schematic diagram of one embodiment of the present invention, a mixed quarter-half-wave PBG device.
Figure 4:
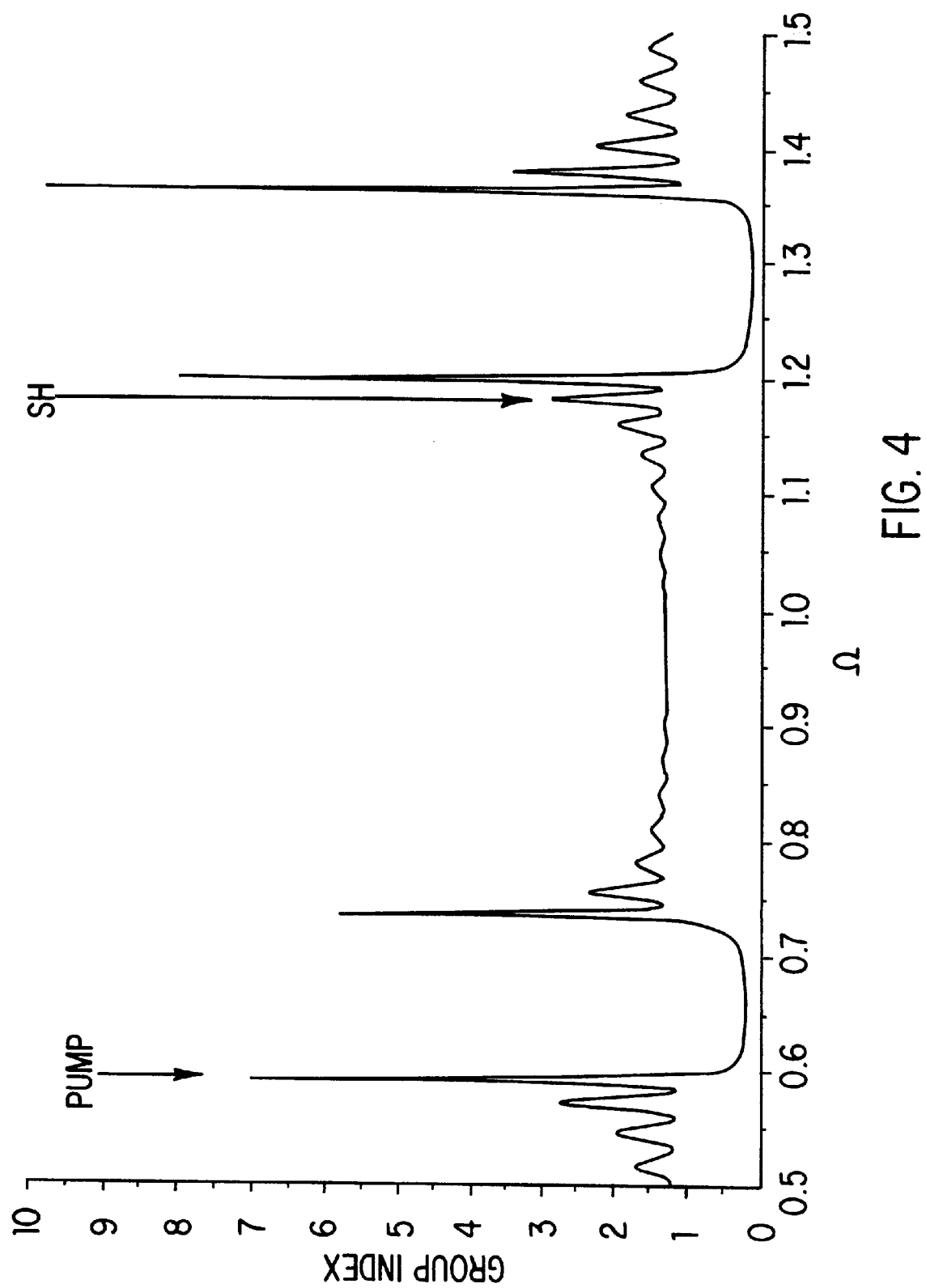
FIG. 4 shows group index versus normalized, dimensionless frequency profile according to the present invention.

A preferred embodiment of the present invention is shown in FIG. 2. PBG structure 200 is formed in such a way that a single period comprises two layers: a quarter-wave layer 202 and a half-wave layer 204, to form a periodic, mixed quarter-half-wave structure. This particular choice causes the first and second order band edges to be approximately a factor of two apart from each other, as indicated in FIG. 4, described in detail below. Then, both the pump and SH fields are tuned to their respective photonic band edges. This coincidence of the band edges leads to strong overlap of the fields, significant reduction of the wave velocities by several orders of magnitude below the speed of light in either medium, and increased interaction times. See, e.g., "Pulsed second harmonic generation in one-dimensional, periodic structures", Phys. Rev. A, October 1997, by Scalora el al. (incorporated by reference herein in its entirety). These factors result in an increase in the SH energy output that significantly exceeds conventional QPM devices.

Figure 3:
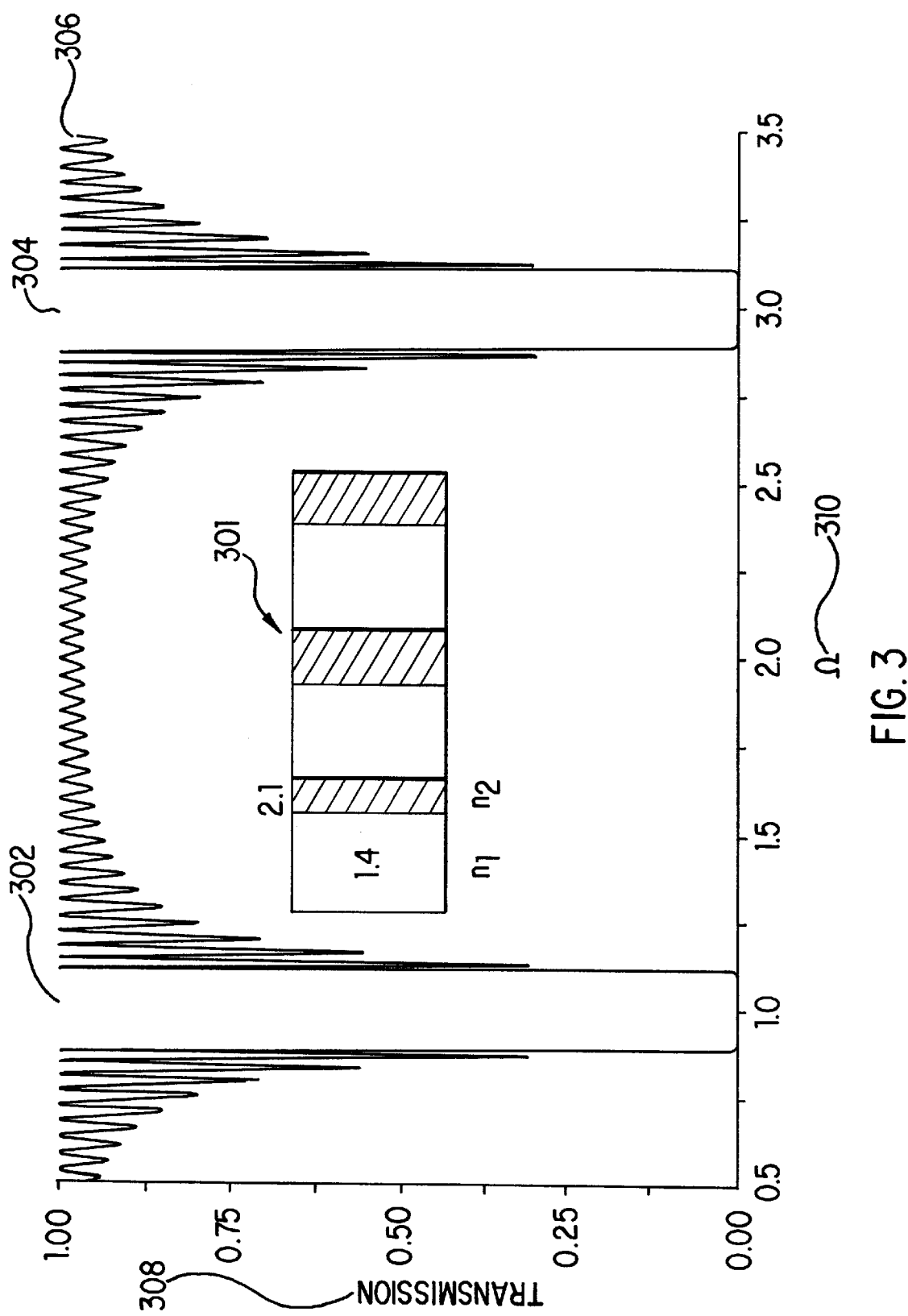
FIG. 3 shows a characteristic transmission profile for a PBG device for third harmonic generation according to the present invention.

The types of structures discussed above result in a PBG structure in which a range of frequencies about some reference frequency cannot propagate inside a PBG device. On the other hand, the structure may be transparent to other frequencies away from the band gap. For example, a representative photonic band gap structure is shown in FIG. 3, which shows a characteristic transmission profile for structure 301. At higher frequencies, higher order gaps may also appear to create a series of gaps. Usually, however, the higher order gaps are ignored. In FIG. 3, both the first order band gap 302 and second order band gap 304 are depicted. Typically, a uniform PBG structure, such as that shown in FIG. 1A, exhibits an infinite number of photonic band gaps and band edges. In FIG. 3, transmission profile 306 is obtained by plotting the optical transmission 308 as a function of normalized frequency ($\Omega$) 310, where $\Omega = \omega/\omega^0$. The maximum possible transmission is 1. Therefore, it is the absence of those frequencies from the transmitted spectrum that gives rise to the name "band gap", in analogy to the electronic band gap of semiconductors where electrons having a specific range of energies cannot propagate inside a semiconductor crystal.

At frequencies outside the photonic band gap, the properties of the structures are such that a series of transmission resonances are obtained. The number of such resonances is equal to the number of periods that make up the structure. The bandwidth of said resonances is a sensitive function of the total number of periods, the indices $n_1$ and $n_2$, and their difference $\delta n = |n_2 - n_1|$, also known as index modulation depth.

In regard to SH generation, a PBG structure can be formed where nonlinear gain, or the production of SH signal, is maximized. Using the calculations described in detail below, the equations that describe the propagation of electromagnetic waves in PBG structures can be solved. The results of the calculations show that if a pulse of light interacts with a nonlinear $\chi^{(2)}$ medium to produce a SH signal, then the SH energy output from the PBG structure is approximately three orders of magnitude greater than the energy output of a simple bulk nonlinear medium of approximately the same length.

One embodiment of the present invention is a PBG structure that comprises 20 periods (or 40 layers) of alternating layers of GaAs and AlAs. Alternatively, the PBG structure can also comprise different sets of materials, for example, air and GaAs, glass and AlAs, a combination of other dielectric materials, as well as with materials that would not conventionally be considered as nonlinear materials. In addition, the PBG structure may also be created in an optical fiber, in the form of a fiber grating. This illustrates that this frequency conversion capability is not specific to any one material, and that some flexibility exists according to the specific needs of a particular application. Accordingly, the structure of the present invention should not be limited solely to the embodiments described herein.

According to the present invention, a pulse of light of about one picosecond or more in duration can be tuned to the frequency corresponding to the maximum of the first transmission resonance away from the low frequency band edge. This is shown schematically in FIG. 4, which plots group index as a function of normalized frequency. The total energy of a signal produced at twice the frequency of a pump (i.e., at the SH frequency) is about 1000 times greater than the energy output of a QPM device of similar nonlinear properties and dimensions, but that does not exhibit a photonic band gap structure. Accordingly, the signal generated at the second harmonic frequency is tuned to the second transmission resonance of the low frequency band edge of the second order gap, as shown in FIG. 4.

According to the present invention, if the enhancement of any other frequency is desired, for example, a difference or sum frequency, it will be apparent to one of skill in the art based on the present description to devise a PBG structure such both the pump and the desired frequency are both tuned to a photonic band transmission resonance. If higher conversion efficiencies are sought, the calculations explained in detail below indicate that such conversion efficiency increases can be accomplished by only modest increases in the number of periods that comprise the structure. The reason for this is that the conversion efficiency in a typical PBG structure is very sensitive to the length of the structure. For example, if N is the number of periods comprising the device, then the energy output is approximately proportional to the $N^6$. As would be apparent to one of skill in the art based on the present description, an optimization procedure can then be employed to produce the ideal parameters for the up- or down-conversion process for a particular application.

Figure 5:
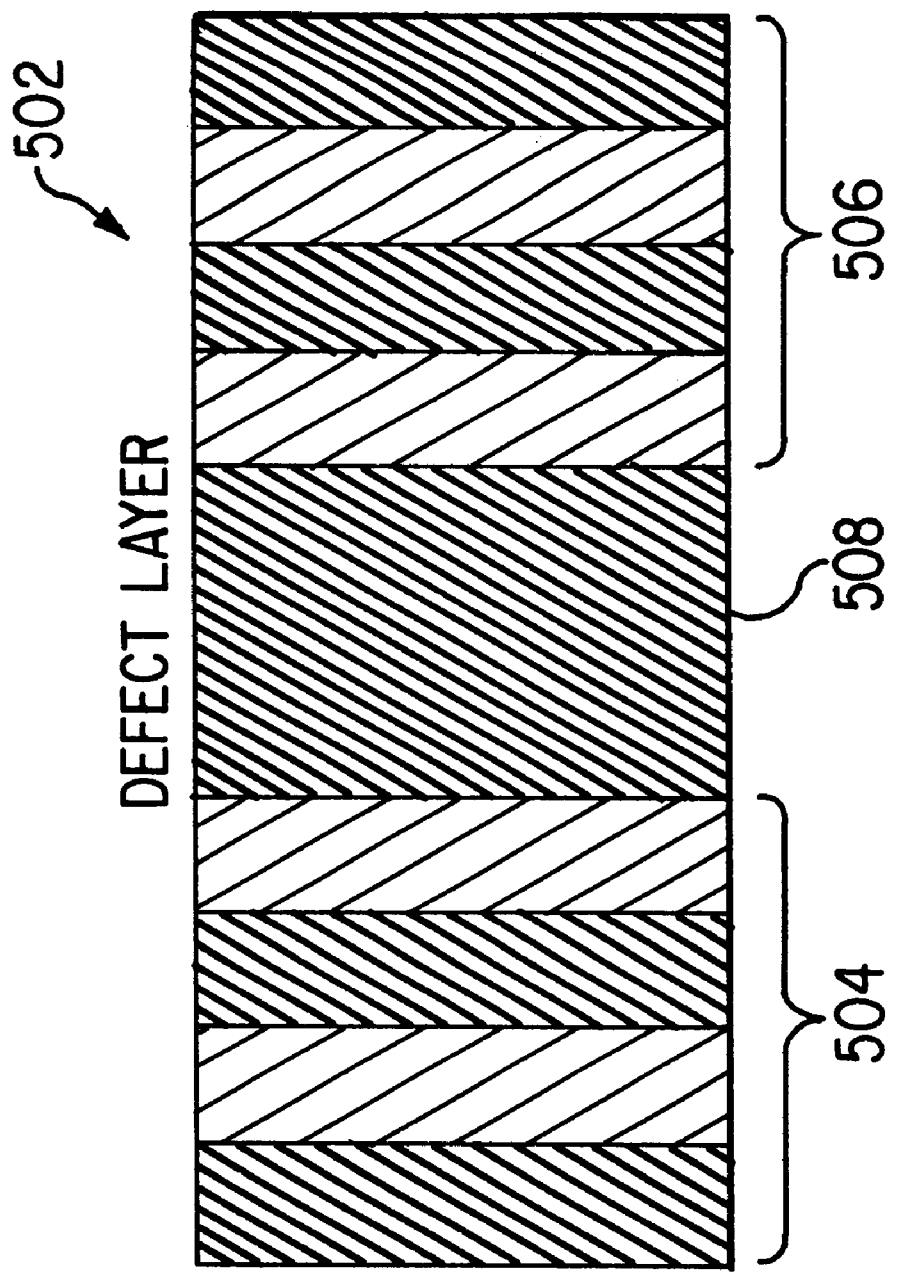
FIG. 5 shows one embodiment of the present invention, a PBG device with a periodicity defect region.

For example, in the case of third harmonic generation, a PBG structure comprises a quarter-wave periodic structure with a "defect" layer one half wavelength thick at the center of the structure. This embodiment is shown schematically in FIG. 5. Device 502 comprises at least two stacks (or regions) 504 and 506 of alternating layers of refractive materials similar to those described above in connection with FIG. 1A. In the center of device 502, a periodicity defect region 508 is interposed (or placed) between stacks 504 and 506, with each stack having an equal number of alternating layers of refractive material. Defect region 509 is also a refractive material that can have an index of refraction (n) that is equivalent to either $n_1$ or $n_2$, and with the same $\chi^{(2)}$ nonlinear coefficient. For example, if individual layer thicknesses in the uniform stacks 504 and 506 are taken to be one quarter-wavelength long, then the thickness of periodicity defect region 508 can be one half or one wavelength in thickness. However, other thicknesses for periodicity defect region 508 can also be utilized. The term "defect", in this context, simply means a break in the periodicity of the structure.

Figure 6:
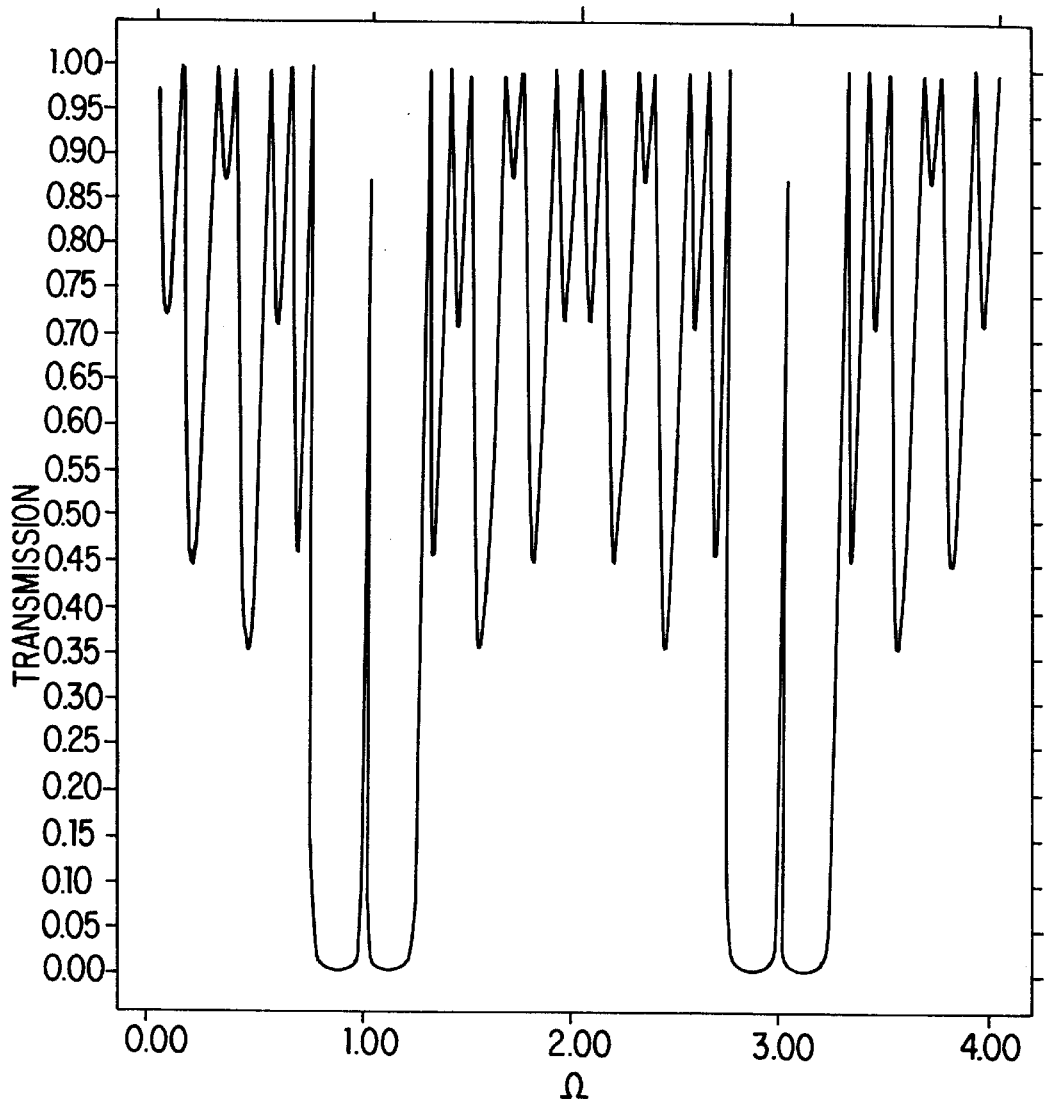
FIG. 6 is a diagram of the characteristic index of refraction profile of the PBG structure shown in FIG. 5.

This defect layer breaks the periodicity in such a way that it generates a transmission resonance in the middle of every gap, as shown in FIG. 6. Here, the distance between the center of the first and second order gap is exactly a factor of three. Therefore, tuning the pump signal to the center of the first order gap will enhance the generation of light at the third harmonic. For example, using a pump signal wavelength of approximately 1550 nm, such as found in conventional communications laser diodes, a third harmonic signal will be output from the PBG device at a wavelength of approximately 516 nanometers (nm). Therefore, by selecting the proper set of parameters, such as material type, material parameters, and the exact geometrical properties of the materials (i.e., layer thickness), a person of skill in the art can arrive at a device with the desired properties.

Another embodiment of the present invention is a PBG device comprising a plurality of periodicity "defects." In other words, several defects of varying thicknesses can be placed in a PBG device. The placement of these multiple defects between stacks of alternating layers forms an a-periodic structure, that also exhibits a photonic band gap structure. This a-periodic structure can be utilized to perform any of the frequency conversion techniques described herein, as would be apparent to one of skill in the art based on the present description.

According to the present invention, conversion efficiencies can be even higher for structures with an increased number of periods. For example, by increasing the structure length by 50% (from 20 to 30 periods), the energy output can increase by a factor of 5. However, it should be noted that: (1) the transmission resonance bandwidth decreases as $1/N^2$, where N is the number of periods, so that the pulse duration needs to be increased in order to ensure large pump enhancement inside the structure; and (2) a material breakdown may occur because of excessive electric-field buildup, or enhancement, inside the PBG structure.

Consideration of nonlinear effects highlight even more dramatic differences between the PBG structures of the present invention and conventional nonlinear materials used for frequency conversion. Typical nonlinear index changes in GaAs or AlAs layers can be of order $\delta n_{NL} \approx 10^{-3}$. This implies that nonlinear index shifts can be larger than the linear index modulation depth. Consequently, the location of the gap on the frequency axis can shift dramatically to higher or lower frequencies, and its bandwidth can increase or decrease significantly, depending on the sign of the nonlinearity.

In contrast, the frequency bandwidth of an ultrashort pulse of only a few hundred optical cycles in duration (i.e., in the femto-second regime) can be smaller (depending on the wavelength) than the bandwidth of the PBG's first transmission resonance peak, where the group velocity is a minimum. Here, ultrashort pulse propagation can be non-dispersive. In addition, the nonlinear index change remains orders of magnitude smaller than the index modulation depth, which for PBG structures can be of order unity or larger. Thus, gap and transmission resonance bandwidths, and their locations, are only marginally altered, although changes may be sufficient for the onset of optical limiting and switching, optical diode behavior, and strong pulse reshaping.

The stability of the band structure in the frequency domain is also important in parametric optical up- and down-conversion, and harmonic generation. This result highlights the fact that a new generation of compact and efficient high gain optical amplifiers and optical parametric oscillators based on photonic band-edge effects can be achieved according to the present invention.

The enhancement of gain in these PBG structures is understood by recalling that the density of accessible field modes in the vicinity of dielectric boundaries is modified by the boundary. This means that if a linear or nonlinear gain medium is introduced with in a PBG structure, the stimulated and spontaneous emission rates are modified according to Fermi's golden rule (see below). In QPM structures, a minimization of the phase difference between the waves is desirable in order to avoid a phase mismatch in the continuous wave case. For QPM devices, this minimization of phase difference is typically achieved by poling the active material, which is uniform in its composition and contains no linear index discontinuities. Accordingly, the nonlinear coefficient only alternates sign in the longitudinal direction every few tens of micrometers ($\mu$m).

For the PBG structures of the present invention, the unusually strong confinement of both the pump and the SH signal that occurs near the photonic band edges is relied on. Where the density of electromagnetic field modes is large, the group velocity is low, the field amplitude may be enhanced over bulk values by one order of magnitude or more, and strong pump and SH mode overlap occurs. In this regime, the material is not poled in the usual manner; it is the geometrical properties of the structure that cause strong mode overlap, copropagation, and larger interaction times, the combination of which is ultimately responsible for the enhanced gain of these PBG structures.

The PBG structures discussed above can be manufactured by conventional techniques. Other suitable modifications and adaptations of the variety of reaction conditions and parameters normally encountered in preparing photonic and semiconductor devices will be apparent to those skilled in the art, without departing form the spirit and scope of the invention.

As discussed above, the invention can be implemented in group III–V or II–VI material systems, as well as with dielectric materials. For purposes of explanation, the above examples are described in GaAs/AlAs material systems, but it will be understood by those skilled in the art that the invention described herein can also be implemented with other III–V or II–VI systems.

Further, background material concerning semiconductor solid-state physics may be found in a number of references including two books by S. M. Sze, titled: *Physics of Semiconductor Devices*, John Wiley and Sons, Inc., New York (1981), and *Semiconductor Devices, Physics and Technology*, John Wiley and Sons, Inc., New York (1985), both of which are incorporated herein by reference. Those skilled in the art can readily manufacture the layered devices disclosed according to conventional processing techniques without undue experimentation.

4. Example Applications

The PBG structures of the present invention can be utilized to perform a variety of frequency conversion techniques. As described above, a mixed quarter-half-wave structure can be utilized to perform SH generation of a variety of coherent light sources, including tunable solid state lasers, gas lasers and semiconductor diode lasers. For example, a PBG structure can be placed at the output facet of a conventional AlGaAs diode laser that emits a laser beam at a wavelength of approximately 810 nm. Diode lasers of various output wavelengths are commercially available from a number of commercial vendors, including Spectra Diode Labs, Inc. and Coherent Inc., both of California. By choosing the proper set of alternating layer materials, by selecting an appropriate set of layer thicknesses, and by choosing an appropriate number of periods for the PBG device, an output at approximately 405 nm can be achieved from the PBG device. This type of device would be outputting "blue" laser emission, which is extremely valuable for communications and optical storage applications. In addition, because of the compact size and angular independence of the PBG device (as opposed to conventional non-linear materials such as potassium dihydrogen phosphate (KDP), β-barium borate (BBO), lithium triborate (LBO), which are extremely dependent upon angular alignment), SH generation optical cavity arrangements (e.g., external cavity and intra-cavity designs) would be very straightforward to design. Typical optical layouts for harmonic generation are well known. See e.g., W. Koechner, "Solid-State Laser Engineering," Springer-Verlag, $2^{nd}$Ed. (1988), especially Chapter 10, which is incorporated by reference herein. Known anti-reflection coatings can also be utilized to reduce spurious reflections, as would be apparent to one of skill in the art.

In addition, the PBG structures of the present invention can also be utilized in parametric oscillation techniques where, for example, output wavelengths greater than the pump pulse wavelengths can be generated. Based on the known methods of optical parametric oscillation, such as those described in the Koechner reference, it would be apparent to one of skill in the art to design a parametric device utilizing the PBG structure of the present invention to achieve frequency conversion at lower frequencies (i.e., longer wavelengths).

Further, optical fiber gratings can be designed similar to the types of PBG structures described above. Optical fiber gratings are also periodic structures. The index of refraction for a fiber grating can achieve an index modulation depth (i.e., a high and low value) similar to that of high index contrast semiconductor structures. However, fiber gratings are structures with a smaller index discontinuity than that associated with a semiconductor PBG structure: for a fiber grating an index modulation along its core is typically on the order of $\delta n=10^{-3}$ to $10^{-4}$, as opposed to a semiconductor PBG structure with an index modulation approaching unity. Since the bandwidth of transmission resonances and band gaps are proportional to $\delta n$ (the index modulation depth), fiber grating frequency conversion devices are preferred for use with optical pulses of longer (i.e., nanosecond) duration in order to preserve their shape.

A fiber grating can be created on an optical fiber by well-known fabrication techniques. For example, see the fiber grating applications and fabrication techniques described in "Continuously tunable single-mode erbium fiber laser," by G. Ball and W. Morey, *Optics Letters*, Vol. 17, No. 6, p.420 (1992) and "Spatially-multiplexed fiber-optic bragg grating strain and temperature-sensor system based on interferometric wavelength shift," by Y. Rao, el al., *Electronics Letters*, Vol. 31, No. 12, p. 1009 (1995), which are both incorporated by reference in their entirety.

For example, fiber grating fabrication can be accomplished by placing an optical "mask" over a photo-sensitive fiber core and then by illuminating the mask-fiber assembly with a high intensity ultraviolet light beam, such as an Excimer laser. The resulting grating, referred to as a fiber grating, displays much the same properties of a high index contrast semiconductor PBG structure, especially with respect to band gaps and transmission resonances. In addition, a mask can be designed to create a grating that imparts either a band-edge effect or a transmission resonance similar to the one shown above in FIG. 5. Based on the present description it would be apparent to one of skill in the art to design a fiber grating capable of frequency conversion. For example, a fiber grating device designed according to the parameters discussed above can be coupled to the output of a laser diode to produce a compact source capable of output emissions in the blue wavelength range.

5. Model a. Equations

According to the present invention, a model can be utilized to allow one of ordinary skill in the art to design a PBG structure to perform optical frequency conversion for a desired application. For example, shown here is an analysis describing the dynamics associated with ultrashort pulses (about 1 ps or less) in one-dimensional systems. This model extends the analysis of SH generation and enhancement to arbitrarily deep PBG gratings in the pulsed regime by directly integrating Maxwell's equations in the time domain.

Figure 7:
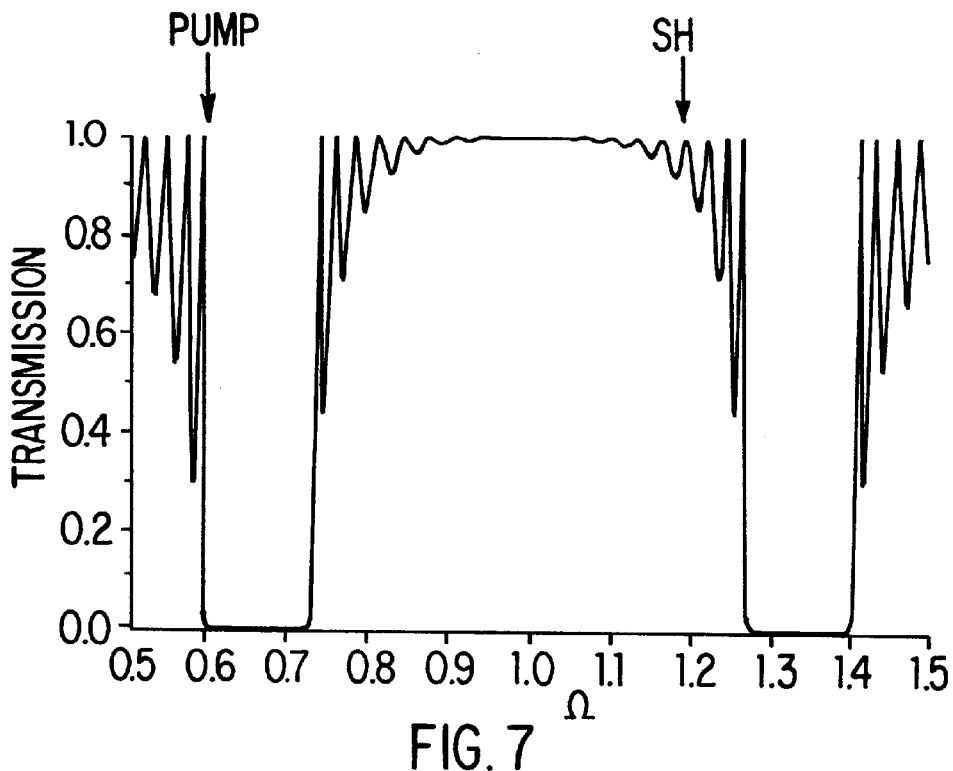
FIG. 7 shows a transmission versus normalized, dimensionless frequency for a 20-period, half-quarter-wave stack.

Consider the following simple one-dimensional system similar to device 200 shown in FIG. 2. The example device comprises 40 dielectric layers (20 periods in all, roughly 12 $\mu$m thick for a reference wavelength of 1 $\mu$m), and the index of refraction alternates between a high and a low value, $n_2=1.42857$ and $n_1=1$. A small value of $\chi^{(2)} \approx 0.1$ pm/V (roughly $3 \times 10^{-9}$ cm/statvolt in Gaussian units) is chosen and it is assumed that the nonlinear material is distributed uniformly throughout the PBG structure. Then, for a reference wavelength $\lambda_0$, the layers have thicknesses $a=\lambda_0/(4n_1)$ and $b=\lambda_0/(2n_2)$, respectively. This forms a mixed half-quarter-wave stack for wavelength $\lambda_0$. A range of frequencies is reflected, as shown in FIG. 7, where the transmission coefficient for this structure is plotted as a function of the scaled frequency $\Omega=\omega/\omega_0$, where $\omega_0=2\pi c/\lambda_0$. FIG. 7 indicates that this choice of parameters causes the location of the second-order gap to be removed from the first-order gap by approximately a factor of 2. For an ordinary quarter-wave structure, such as the device shown in FIG. 1, a factor of 3 separates the first- and second-order band edges. Utilizing these two edges is more suitable for third-harmonic generation.

The equations of motion can be derived beginning with Maxwell's equation for the total field, in Gaussian units, and can be written as:

$$\frac{\partial^2}{\partial z^2} E(z,t) - \frac{n^2}{c^2} \frac{\partial^2}{\partial t^2} E(z,t) = \frac{4\pi}{c^2} \frac{\partial^2}{\partial t^2} P_{NL}. \tag{1}$$

Here, $P_{NL}$ is the total nonlinear polarization. Without loss of generality, the fields can arbitrarily and conveniently be decomposed as follows:

$$E(z,t)=\epsilon_\omega(z,t)e^{i(kz-\omega t)}+\text{c.c.}+\epsilon_{2\omega}(z,t)e^{2i(kz-\omega t)}+\text{c. c.}, \tag{2}$$

$$P_{NL}(z,t)=\rho_\omega(z,t)e^{i(kz-\omega t)}+\text{c. c.} +\rho_{2\omega}(z,t)e^{2i(kz-\omega t)}+\text{c. c.} \tag{3}$$

This decomposition highlights the fundamental and second-harmonic angular frequencies. The nonlinear polarization can be expanded in powers of the electromagnetic field strength as follows:

$$P_{NL}(z,t)=\chi^{(2)}E^{(2)}(z,t)=2\chi^{(2)}\epsilon_\omega^*(z,t)\,\epsilon_{2\omega}(z,t)e^{i(kz-\omega t)}+\text{c.c.}+\chi^{(2)}\epsilon_\omega^2(z,t)e^{2i(kz-\omega t)}+\text{c.c.} \tag{4}$$

While one can assume an initial left- or right-propagating pump pulse, the SH signal is initially zero everywhere. The direction of propagation of the spontaneously generated SEI field and the exact nature of the quasi-standing wave inside the structure are dynamically determined by (a) the nature of the initial and boundary conditions, (b) pump-frequency tuning with respect to the band edge, and (c) the distribution of nonlinear dipoles inside the structure. This nonlinear dipole distribution can significantly affect the results. SH generation is a phase-sensitive process. The field and its phase at any point inside the structure are a superposition of all fields originating everywhere else inside the structure. Thus, the phase is important element that should be included in the integration of the equations of motion. However, dipole distribution is important to the extent that it is modified in the layers where the fields happen to be localized. For example, near the low-frequency band edges, the fields are localized in the high-index layers. Modifying the nonlinear medium distribution in the low-index layers will have little effect, although some mode overlap between layers always occurs.

For this model, ultrashort incident pulses propagating in the presence of large index discontinuities are considered. Therefore, all second-order spatial derivatives should be retained in order to properly include boundary conditions. However, it can be assumed that pulse envelopes have a duration that is always much greater than the optical cycle, thus allowing the application of the slowly varying envelope approximation in time (SVEAT) only. For a general description of SVEAT, see Scalora, M., el al, *Phys. Rev. Left.* 73:1368 (1994), which is incorporated by reference herein in its entirety. The equations of motion for the fundamental and the second-harmonic fields can be derived as follows. First, substituting Eq. (2) into Eq. (1) yields:

$$\frac{\partial^2 \varepsilon_\omega}{\partial z^2} + 2ik\frac{\partial \varepsilon_\omega}{\partial z} - k^2\varepsilon_\omega - \frac{n_\omega^2}{c^2}\frac{\partial^2 \varepsilon_\omega}{\partial t^2} + \frac{2i\omega n^2}{c^2}\frac{\partial \varepsilon_\omega}{\partial t} + \frac{\omega^2}{c^2}n_\omega^2\varepsilon_\omega = \quad (5)$$
$$\frac{4\pi}{c^2}\left(\frac{\partial^2}{\partial t^2}P_\omega - 2i\omega\frac{\partial}{\partial t}P_\omega - \omega^2 P_\omega\right),$$

$$\frac{\partial^2 \varepsilon_{2\omega}}{\partial z^2} + 4ik\frac{\partial \varepsilon_{2\omega}}{\partial z} - 4k^2\varepsilon_{2\omega} - \frac{n_{2\omega}^2}{c^2}\frac{\partial^2 \varepsilon_{2\omega}}{\partial t^2} + \frac{4i\omega}{c^2}n_{2\omega}^2\frac{\partial \varepsilon_{2\omega}}{\partial t} + \quad (6)$$
$$4\frac{\omega^2}{c^2}n_{2\omega}^2\varepsilon_{2\omega} = \frac{4\pi}{c^2}\left(\frac{\partial^2}{\partial t^2}P_{2\omega} - 4i\omega\frac{\partial}{\partial t}P_{2\omega} - 4\omega^2 P_{2\omega}\right)$$

where k=ω/c, and the SVEAT is made. This choice of wave vector is simply an initial condition consistent with a pump field of frequency ω initially propagating in free space, located away from any structure. Any phase modulation effects that ensue from propagation (i.e., reflections and nonlinear interactions) are accounted for in the dynamics of the field envelopes. The inclusion of all second-order spatial derivatives in the equations of motion means that reflections are accounted for to all orders, without any approximations. Therefore, assuming that pulses never become so short as to violate SVEAT (usually this means a few tens of optical cycles if propagation distances are on the order of pulse width), neglecting all but the lowest order temporal contributions to the dynamics, and using the nonlinear polarization expansions of Eqs. (4), Eqs. (5) and (6) become:

$$n_\Omega^2 \varepsilon_\Omega(\xi,\tau) = \frac{i}{4\pi\Omega}\frac{\partial^2 \varepsilon_\Omega}{\partial \xi^2} - \frac{\partial \varepsilon_\Omega}{\partial \xi} + i\pi(n_\Omega^2 - 1)\Omega\varepsilon_\Omega + i8\pi^2\Omega\chi^{(2)}\varepsilon_\Omega^*\varepsilon_{2\Omega}, \quad (7)$$

$$n_\Omega^2 \varepsilon_{2\Omega}(\xi,\tau) = \frac{i}{8\pi\Omega}\frac{\partial^2 \varepsilon_{2\Omega}}{\partial \xi^2} - \frac{\partial \varepsilon_{2\Omega}}{\partial \xi} + i\pi(n_{2\Omega}^2 - 1)2\Omega\varepsilon_{2\Omega} + i8\pi^2\Omega\chi^{(2)}\varepsilon_\Omega^2. \quad (8)$$

Here $\xi=z/\lambda_0$, and $\tau=ct/\lambda_0$. Equation (8) describes the rate of change of the SH field, whereas equation (7) describes the pump (or fundamental) signal. The spatial coordinate has been conveniently scaled in units of $\lambda_0$; the time is then expressed in units of the corresponding optical period. Thus, by knowing the indices of refraction for the layers of the PBG device, the pump signal frequency and bandwidth and the pump signal intensity, one can design a PBG structure to yield a desired output signal having a frequency different from the pump signal.

As discussed, both forward and backward SH generation can occur. In other words, a frequency conversion device can either transmit or reflect the output harmonic signal. Additionally, assuming that the medium is dispersionless, and the pump signal is tuned at the low-frequency band-edge transmission resonance, then the SH frequency is found well away from the second-order band edge: it is tuned in the middle of the pass band, as indicated in FIG. 7. In order to properly tune the SH signal frequency near the band edge, material dispersion is introduced. This causes changes in the band structure. Specifically, all higher-order gaps tend to move down in frequency, causing the SH signal to be tuned closer to the low-frequency, second-order band edge, where the electromagnetic density of states is largest.

From a calculational standpoint, varying the amount of dispersion is straightforward to undertake. From a fabrication standpoint, obtaining the same conditions can be more difficult. However, the inventors find that the band structure and its features are strongly influenced by (a) the number of periods, (b) layer thickness, and (c) material dispersion. For example, increasing (or decreasing) the number of layers sharpens the band edges, and increases (or decreases) the number of transmission resonances between gaps, causing an effective shift of each resonance. Changing layer thickness away from the quarter- or half-wave conditions (in units of $\lambda_0$) can also cause frequency shifts in the location of the band gaps and transmission resonances. A structure with the desired properties can be realized when these frequency shifts are coupled with material dispersion.

In order to find the optimal parameters for SH generation, i.e., tuning with respect to the band edge, the index of refraction of the high-index layer is varied from $n_2(2\Omega)$= 1.42857 to $n_2$ (2Ω)=1.65. The higher-index value corresponds to SH generation just inside the second-order gap, where its suppression is expected. For intermediate values of the index, SH generation also occurs at frequencies where the density of modes is a maximum. The degree of dispersion assumed is typical of the degree of dispersion found in both dielectric or semiconductor materials, 5–10% in this case.

Recall that FIG. 4 shows the group index, defined as $N_g$=cdk/dω, for a preferred PBG sample, similar to that shown in FIG. 2. Note that the maximum group index is also a sensitive function of δn, the index modulation depth, and the number of periods. The maximum value of the group index for this mixed half-quarter-wave structure is similar in magnitude to that of a quarter-wave, 20-period structure with the same index modulation depth. In this case, $n_2(\Omega)$= 1.42857, and $n_2$ (2Ω)=1.519. Note also that the magnitude of this function is largest near the high-and low-frequency band edges.

b. Picosecond input pilse model

In this example, the pump pulse frequency is chosen to correspond to the low-frequency band edge, where the transmission resonance is approximately unity and the group index is a maximum (Ω=0.591 in FIG. 2). A high pump index implies that a dramatic increase in the field intensities inside the structure occurs at that frequency. This is important, since SH gain is nonlinear in the field, as Eq. (8) suggests. By choosing the index of refraction such that $n_2$ (2Ω) =1.519, the SH frequency coincides with the second density of modes maximum on the low-frequency side of the second-order band gap (see FIG. 4). Here, the total-energy output from the PBG device with respect to the index-matched bulk, which includes forward and backward SH generation, varies from one order of magnitude for a pump pulse only 60 optical cycles in duration (1/e width of the intensity envelope is about 200 femto-seconds (fs) if λhd 0=1 μm), to approximately 500 times for pulses about 1 ps long. For sub-picosecond pulses, the enhancement is reduced due to the broad frequency content of the pulse.

SH generation is not at a maximum when the SH signal is tuned at the density of the mode maximum, because the fields do not have the right phase for this to occur. As an example, using the known matrix transfer method, it can be found that the phase of the transmitted, plane-wave field undergoes a π phase shift across the gap, and a phase shift of 2π, between consecutive resonances on the same side of any gap. Therefore, the number of periods chosen can have an impact on the overall phase of the SH field inside the structure. For short pulses, the circumstances arc much more complicated, because of their broadband frequency makeup.

Figure 8:
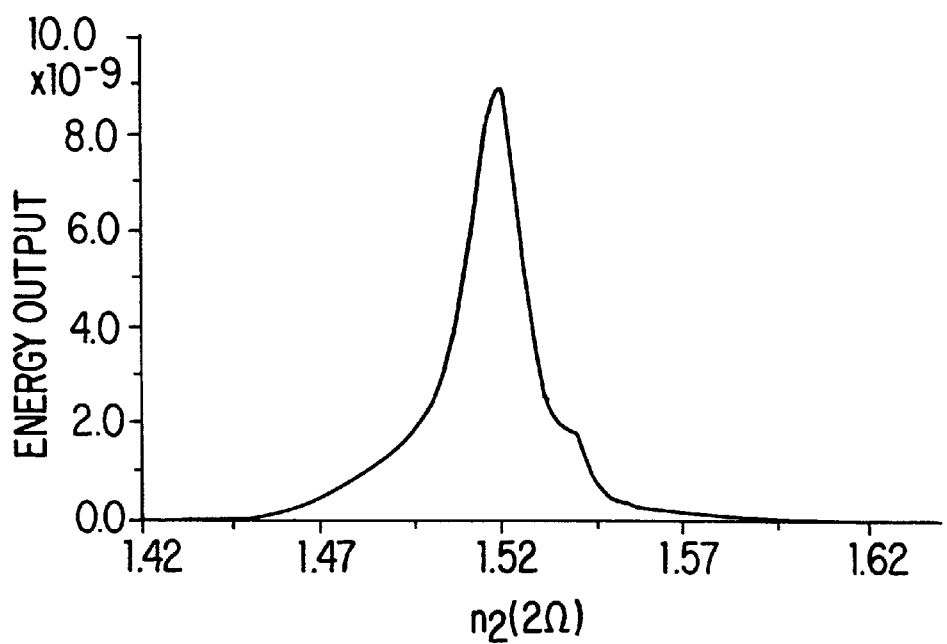
FIG. 8 shows maximum energy output versus index of refraction.

FIG. 8 shows the calculated SH energy output for a 1 ps pulse, as a function of $n_2(2\Omega)$, i.e., dispersion. The maximum energy output occurs when $n_2(2\Omega)$=1.519, which corresponds to the second transmission or group index maximum. The band structure for $n_2$=1.519 is illustrated in FIG. 4. Evidence of the curvature of the band structure near the band edge is rather weak away from the second transmission resonance. These results demonstrate that the dipole distribution is also an important factor. In this case, the SH field is generated inside the structure from a continuous distribution of nonlinear dipoles; the nonlinearity is in both the high and low index layers. This dipole distribution determines the form of the propagating eigenmode, and the manner in which the generated signal leaves the structure. Therefore, as would be apparent to one of skill in the art based on the present description, one can likely find a nonlinear dipole distribution that will maximize or further improve SH conversion efficiency.

The above calculations also highlight the importance of pulse width. Pulses whose spectral widths are larger than the band-edge transmission resonance tend to couple poorly with the structure. This situation leads to dispersive propagation, and to only slightly enhanced field intensities inside the PBG structure. On the other hand, a pulse whose frequency band-width is smaller than the band-edge resonance bandwidth has fewer frequency components, experiences little or no dispersion, and allows the field to build up inside the structure by about one order of magnitude or more with respect to its free space or bulk values, where the field amplitude is in general proportional to $E_{free}/n$.

Figure 9:
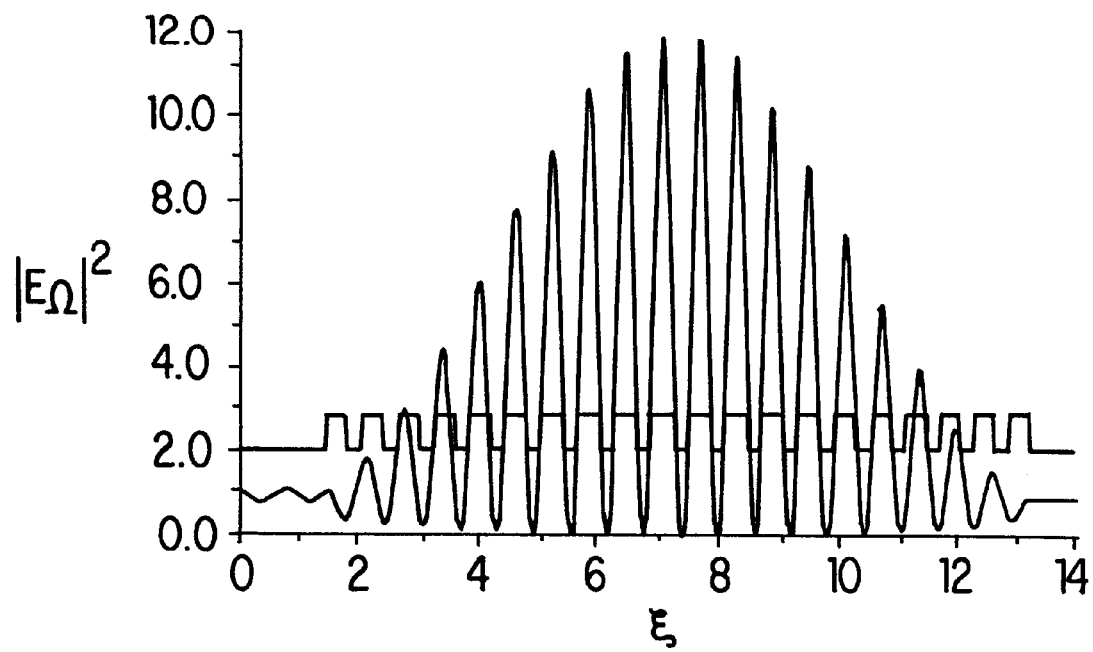
FIG. 9 shows the pump field eigenmode distribution inside a PBG structure of the present invention, at the instant that the peak of the pulse reaches the PBG structure.
Figure 10:
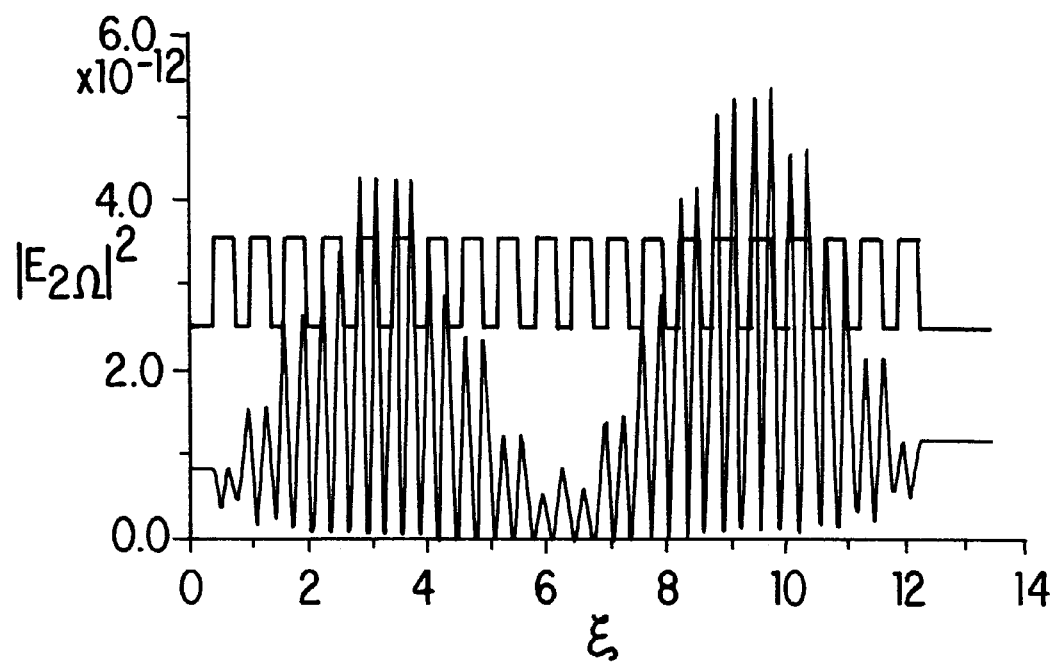
FIG. 10 shows a second-harmonic eigenmode for the case of FIG. 9.

For example, FIG. 9 plots the pump-field intensity inside the structure, at the instant the peak of the 1-ps pulse reaches the structure. As the pulse slows down dramatically, the maximum field intensity is amplified by more than one order of magnitude (compared to its peak value outside the structure) by linear interference effects of backward- and forward- traveling components. FIG. 10, on the other hand, represents the SH field intensity quasistanding-wave pattern at the same instant in time as FIG. 9. Both eigenmodes overlap to a large extent inside the high index layers, and the fields propagate in this configuration for the entire duration of the pump pulse. This mode overlap, combined with the dramatic group velocity reduction for both fields, allows efficient energy exchange between the pump and the SH signal.

Figure 11:
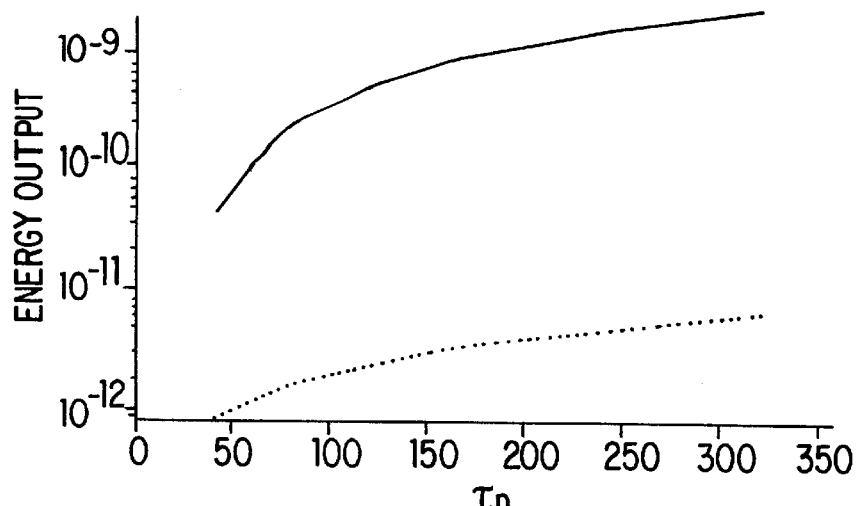
FIG. 11 shows comparison between the SH energy output from the PBG (solid line) and a phase-matched bulk material (dotted line), as a function of pulse width.

FIG. 11 shows the total-energy output (forward and backward included) as a function of incident pulse width, expressed in optical cycles, for a 20-period, 12-$\mu$m-thick device (solid line), and a 12-$\mu$m bulk sample coated with anti-reflection layers at both ends to minimize pump reflections (dotted line). Low input field intensities are considered that yield conversion efficiencies on the order of $10^{-2}$, although this trend persists as long as pump depletion is not significant. For clarity, the abscissa is plotted on a logarithmic scale. FIG. 11 shows that the total-energy output (and therefore power output) becomes about 500 times greater for the PBG sample than for index-matched bulk material when an input pulse width approaches 300 optical cycles, or about 1 ps. The results indicate that at these length scales the energy output for the bulk sample increases linearly with incident pulse width. Thus, this figure clearly demonstrates that suitable output energies can be obtained from the PBG devices of the present invention when continuous wave input pulses are applied.

In contrast, an early exponential increase characterizes energy growth in the PBG case, giving way to linear growth only when pulse width approaches 1 ps. This implies that the pump field eigenmode intensity (and hence SH gain) increases rapidly with pulse width, saturating when a quasi-monochromatic limit is reached, in this case, when pulse frequency bandwidth is somewhat less than band-edge resonance bandwidth.

Figure 12:
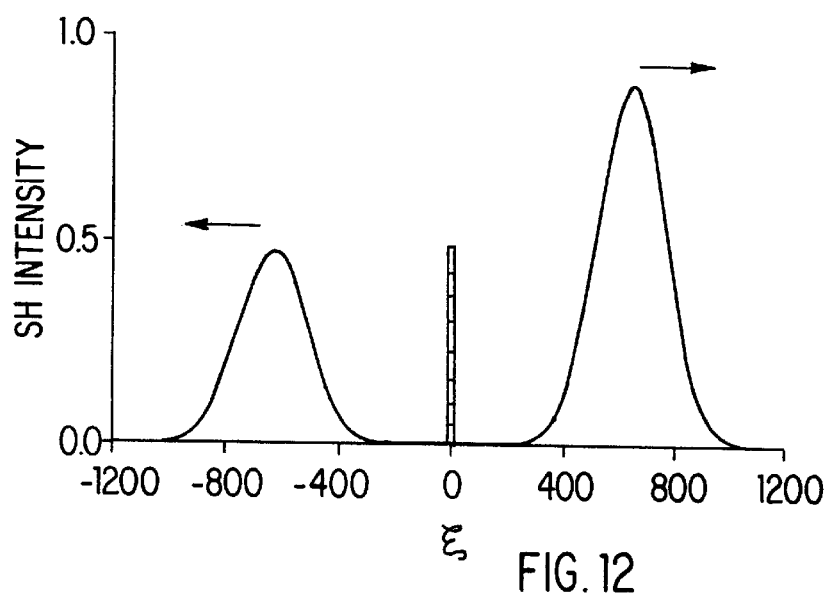
FIG. 12 shows spontaneously generated SH pulses.

Also, both the amplitude and the width of the generated SH pulses increase with increasing incident pulse width. FIG. 12 shows the SH field propagating away from the structure. While the pump was incident from the left, note that the structure radiates significantly in both directions, and that the SH pulses generated have the same width as incident pump pulses. It would be difficult to predict this overall behavior a priori, especially in the absence of analytical results in this regime. Further, tuning the pump away from the band edge, tuning to the high-frequency band edge, or modifying the nonlinear dipole distribution can significantly alter the pattern of FIG. 12.

Figure 13:
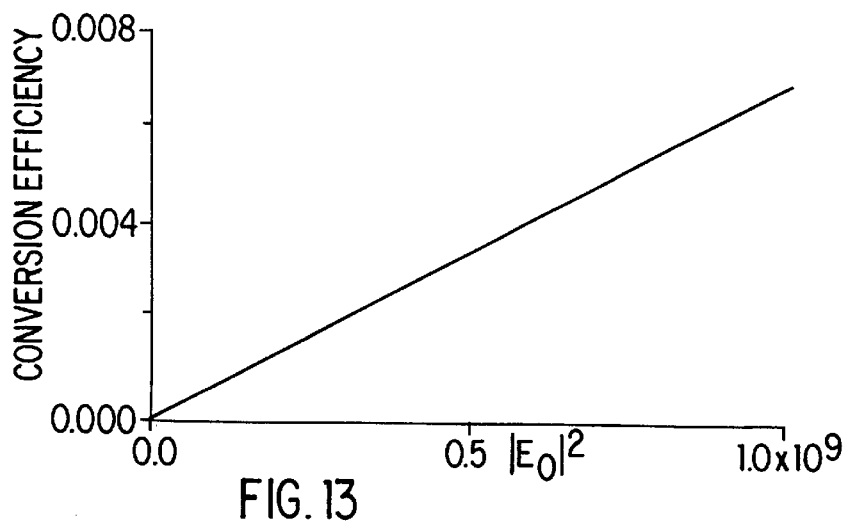
FIG. 13 shows SH conversion efficiency versus incident pulse peak field strength.

FIG. 13 is a plot of the conversion efficiency vs. peak field intensity in Gaussian units, for a pulse of 1 ps duration, where $|E|^2$ of $10^9$ in these units corresponds to roughly 10 GW/cm$^2$ in free space. The free-space value of the energy flow is to be distinguished from energy flow inside the structure. Here, efficiency is defined as the ratio between the final total SH energy and the total initial pump energy. This ratio is also representative of the ratio between the corresponding peak field intensities, respectively. FIG. 13 indicates that for this simple PBG structure only 12 $\mu$m in length, a conversion efficiency of order $10^{-2}$ can be achieved with pump intensity of 10 GW/cm$^2$, yielding a SH signal intensity of approximately 10 GW/cm$^2$. This is quite remarkable, considering that the PBG structure is only a few micrometers in length, only a single pump pass occurs, and that a very modest value of $\chi^{(2)} \approx 0.1$ pm/V is used. Note that a $\chi^{(2)}$ value of 0.1 pm/V is a conservative value. Clearly, materials chosen with even higher $\chi^{(2)}$ values can be incorporated into the PBG structure of the present invention, resulting in conversion efficiencies approaching $10^{-1}$. Considering the extremely compact nature of the PBG device of the present invention, and that the pump traverses the sample only once, the gain-to-device length ratio undergoes several orders of magnitude improvement over current state of the art devices.

Such large enhancements with respect to phase-matched up-conversion can be explained as follows. According to Fermi's golden rule, the power radiating from an oscillating dipole is given by $P(\omega)=\rho(\omega)|E(\omega)|^2$, where $\rho(\omega)$ is the density of modes and $|E(\omega)|^2$ is the eigenmode intensity. The average energy output can be obtained by multiplying the power output by $\tau$, the interaction time. As pointed out above, all these quantities increase by nearly one order of magnitude for the PBG structure. In fact, since $|E(\omega)|^2$ and $\tau$ are both proportional to $\rho(\omega)$, then the total energy emitted is generally proportional to $\rho(\omega)^3$. Hence the significant increase in the total energy output that is shown in FIG. 11.

Higher conversion efficiencies can readily be achieved by increasing pump power, or, as mentioned earlier, by increasing the length of the structure by only modest amounts. For example, calculations show that by increasing the total number of periods to 30, thus increasing the length of the device by 50%, the SH output energy (and power level) increases by a factor of 5 for a 1 ps pulse, enhancing the conversion efficiency by the same factor. This occurs because the maximum group index increases approximately as $N^2$, where N is the number of periods. The field eigenmode intensity is also proportional to $N^2$, thus enhancing energy output in a nonlinear fashion with respect to device length.

Calculations also indicate that in the linear, undepleted-pump regime, the conversion efficiency is proportional to the free-space peak field value, as illustrated in FIG. 13. Here, any small deviation in the actual $\chi^{(2)}$ value, tuning with respect to the band edge, and input pulse width can significantly affect comparison with experimental results. For this reason, the model presented above is of great value in order to determine the overall behavior of a PBG structure, and it can be used in the determination of $\chi^{(2)}$. Therefore, exercising reasonable care in the design process of a PBG device based on the present invention can produce a very efficient SH generator, provided absorption at the SH wavelength is minimized. Note that a similar model can also be used to design an efficient third harmonic generator, and the like.

In another embodiment of the present invention, a structure comprises a series of alternating layers, where $n_1$ ($\Omega, 2\Omega$)=1 and $n_2$ ($\Omega, 2\Omega$)=1.42857. For added simplicity, it is assumed that the material is not dispersive. For this example, layer thicknesses are chosen such that the width of the low index layer is $a=0.65\lambda_0/n_1$ (the low index layer is now the active layer because of the shift in localization of the field), and the width of the high index layer is such that $b=0.089\lambda_0/n_2$. Then, tuning the pump at the first resonance of the first-order, high-frequency band edge causes the SH signal to be tuned at the second resonance of the second-order high-frequency band edge, in analogy to what was accomplished above for the low-frequency band edge. However, the conversion efficiency for the high frequency band edge example can increase up to about a factor of two for a 1 ps pulse, compared to the low-frequency band-edge conversion efficiency. Tuning the pump at the high-frequency band edge causes a shift of the pump field localization in the low index layer. This shift increases the field eigenmode intensity in that layer. Also, the width of the active layer increases by about 30%, from $0.5\lambda_0$ to $0.65\lambda_0$. This combination can account for the increase in overall nonlinear gain for a device length of approximately 12 $\mu$m in length.

C. GaAs/AlAs half-quarter-wave stack for SH generation

This section describes a numerical model of a mixed half-quarter-wave structure comprising 20 periods of GaAs/AlAs material. It was assumed that $\chi^{(2)} \approx 1$ pm/V for both materials, the index of refraction alternated between $n_1(\Omega)$= 2.868 and $n_2(\Omega)$=3.31, $n_1(2\Omega)$=2.9 and $n_2(2\Omega)$=3.35, and that absorption could be ignored. These indices correspond to a pump wavelength of 3 $\mu$m, and a second-harmonic signal at 1.5 $\mu$m. For a pump intensity of 10 GW/cm$^2$ the mixed half-quarter-wave GaAs/AlAs structure produced conversion efficiencies on the order $10^{-2}$–$10^{-3}$ for this 20-period structure. The model equations described above for nonlinear SH gain (which from Eq. (6) is defined as the product $\chi^{(2)}\epsilon^2_\Omega$) indicate that this high conversion efficiency is due to the order-of-magnitude increase in $\chi^{(2)}$ and the order-of-magnitude decrease in the field eigenmode intensity (due to the substantial increase in the index for GaAs). In addition, a significant increase in conversion efficiency can be achieved with increasing number of periods in the PBG structure. These results also indicate that different materials, such as II–VI based semiconductors, would be ideal for up-converting at higher frequencies.

6. Method of Frequency Conversion

Figure 14:
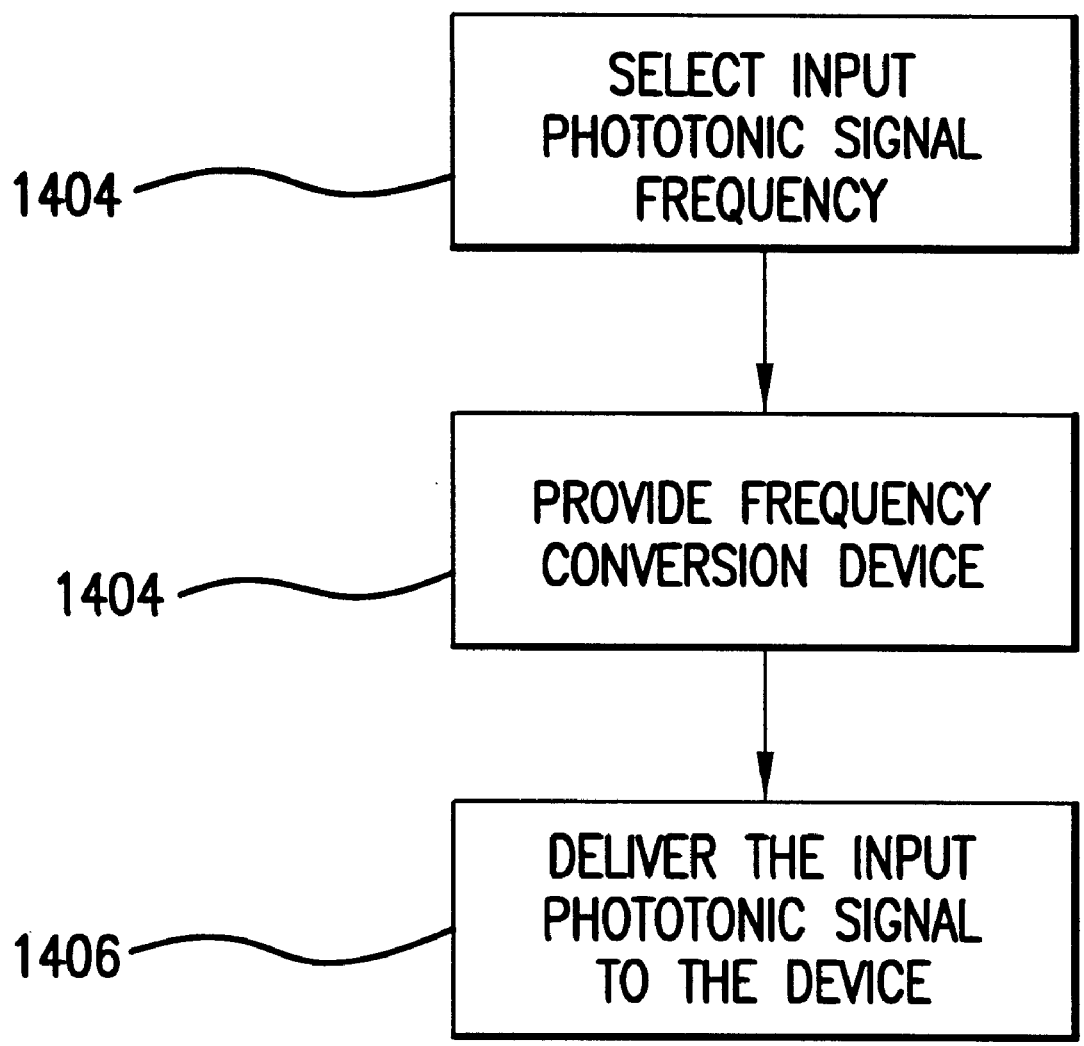
FIG. 14 is a flowchart illustrating a method of generating frequency conversion according to the present invention.

A method for performing frequency conversion of an input photonic signal is shown in FIG. 14. The input photonic signal has an input photonic signal frequency and an input photonic signal bandwith. In step 1402 the frequency of the input photonic signal is selected so as to correspond to a second signal at a desired harmonic frequency. In addition, the type of input signal (e.g., continuous wave or pulsed operation) should also be considered. Next a device is provided in step 1404, where the device comprises an arrangement of material layers that exhibits a photonic bandgap structure. Various types of material layer arrangements are discussed above. The specific type of arrangement (and hence the type of frequency conversion to be performed) depends upon factors that include, but are not limited to: (1) the absorption and transmission properties of the materials selected; (2) the indices of refraction of the materials forming the structure which affects such parameters as the index discontinuity; (3) the thicknesses of the material layers; and (4) the number of periods of alternating layers. The combination of parameters results in a PBG structure that preferably exhibits a transmission band edge corresponding to the input photonic signal frequency. Finally, the input photonic signal is delivered into the device in order to generate a second photonic signal at an harmonic frequency of the pump signal. An interaction of the input photonic signal with the arrangement of layers generates the second photonic signal at a second frequency, where the second frequency is different than the first frequency. It will be apparent to one of skill in the art to use this method to perform such frequency conversion techniques as, for example, harmonic generation and optical parametric oscillation.

7. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all articles and patent documents mentioned above are incorporated by reference herein.

What is claimed is:

1. A device for generating a photonic signal having a frequency different from an input photonic signal incident on the device, the input photonic signal having an input photonic signal frequency and an input photonic signal bandwidth, comprising:

a plurality of first material layers; and a plurality of second material layers, said first and second material layers arranged such that the device exhibits a photonic band gap structure, wherein said photonic band gap structure exhibits a transmission band edge corresponding to the input photonic signal frequency, and wherein an interaction of the input photonic signal with said arrangement of layers generates a second photonic signal at a second frequency, said second frequency being different than the first frequency.

2. The device of claim 1, wherein said first and second material layers are arranged in a periodically alternating manner such that the arrangement formed therefrom exhibits said photonic band gap structure.

3. The device of claim 1, wherein said first material layer has a first index of refraction and said second material layer has a second index of refraction, said first index of refraction and said second index of refraction being different.

4. The device of claim 1, wherein said first material layer has a first thickness and said second material layer has a second thickness, said first thickness and said second thickness being different.

5. The device of claim 1, wherein said photonic band gap structure also exhibits a second transmission resonance at a second order band gap, and wherein said second frequency is tuned to said second transmission resonance.

6. The device of claim 1, wherein said second photonic signal is reflected within the device and exits the device at a surface where the input photonic signal is incident.

7. The device of claim 1, wherein the input photonic signal is a continuous wave input photonic signal generated by a continuous wave laser source.

8. The device of claim 1, wherein said arrangement of layers forms a mixed-quarter-half-wave structure, and said second frequency is a second harmonic of the input photonic signal frequency.

9. The device of claim 1, wherein said arrangement of layers forms a quarter-wave structure.

10. The device according to claim 1. wherein said first and second material layers respectively comprise GaAs and AlAs semiconductor layers, said first and second layers being formed on a semiconductor substrate.

11. The device of claim 1, wherein a length of the device is between approximately 5 and 1000 micrometers.

12. The device of claim 1, wherein a third photonic signal is generated as a result of a frequency mixing process due to an interaction of the input photonic signal and said second photonic signal with said arrangement of layers.

13. The device of claim 1, wherein said first and second layers are arranged in a periodically alternating manner, said arrangement forming a first region, further comprising:
   a second region having periodically alternating material layers, wherein said second region comprises
      a third material layer, and
      a fourth material layer; and
   a periodicity defect region interposed between said first and second regions of periodically alternating material layers, wherein an arrangement of said first region, said second region, and said periodicity region exhibits a photonic band gap structure having a transmission band edge corresponding to the input photonic signal frequency, and wherein an interaction of the input photonic signal with said arrangement of said first region, said second region, and said periodicity region generates a second photonic signal at a second frequency, said second frequency being different than the first frequency.

14. The device of claim 13, wherein said first and second regions are each arranged as quarter-wave structures, and wherein a thickness of said periodicity defect region is approximately ½ wavelength of the input photonic signal.

15. The device of claim 13, wherein said second frequency is a third harmonic of the input photonic frequency.

16. A method for optical frequency conversion of an input photonic signal, the input photonic signal having an input photonic signal frequency and an input pihotonic signal bandwith. comprising the steps of:

selecting the frequency of the input photonic signal so as to produce a second signal at a desired harmonic frequency;

providing a device comprising
   a plurality of first material layers; and
   a plurality of second material layers, said first and second material layers arranged such that said device exhibits a photonic band gap structure, wherein said photonic band gap structure exhibits a transmission band edge corresponding to the input photonic signal frequency, and wherein an interaction of the input photonic signal with said arrangement of layers generates a second photonic signal at a second frequency, said second frequency being different than the first frequency; and inputting the input photonic signal into said device to generate said second signal at said harmonic frequency.

17. The method of claim 16, further comprising:

selecting the materials used in said device such that said first material layer has a first index of refraction and said second material layer has a second index of refraction, wherein said first index of refraction is greater than said second index of refraction, and wherein a difference in said first index of refraction and said second index of refraction corresponds to a desired harmonic frequency of the input photonic signal.

18. The method of claim 16. further comprising:

arranging said first and second material layers in an alternating manner; and selecting a number of periods for said alternating first and second layers to provide a desired conversion efficiency.

19. The method of claim 18, further comprising:

selecting a number of periods for said alternating first and second layers such that a width of said band edge is greater than the input photonic signal bandwidth.

20. The method of claim 18. further comprising:

selecting said materials arranged in said alternating manner, such that an absorption in said materials at the input photonic signal frequency and said harmonic frequency is at a minimum.

* * * * *